(12) United States Patent
Guo et al.

(10) Patent No.: US 12,744,059 B1

(45) Date of Patent: Sep. 22, 2026

(54) MAGNETIC RECORDING MEDIA WITH HIGH MAGNETIZATION ABSORPTION LAYER AND GRADIENT SEGREGANT STRUCTURE

(71) Applicant: Western Digital Technologies, Inc., San Jose, CA (US)

(72) Inventors: Wei Guo, Santa Clara, CA (US); Huanqin Guan, Milpitas, CA (US); Cristian Papusoi, Santa Clara, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 19/210,214

(22) Filed: May 16, 2025

Related U.S. Application Data

(60) Provisional application No. 63/774,575, filed on Mar. 19, 2025.

(51) Int. Cl.

| | |
|---|---|
| ***G11B 5/73*** | (2006.01) |
| ***G11B 5/66*** | (2006.01) |
| *G11B 5/00* | (2006.01) |

(52) U.S. Cl.
CPC ........ *G11B 5/66* (2013.01); *G11B 2005/0021* (2013.01)

(58) Field of Classification Search
CPC ....... G11B 5/66; G11B 5/7375; G11B 5/7379; G11B 5/84; G11B 2005/0021;
(Continued)

(56) References Cited

U.S. PATENT DOCUMENTS

| | | | |
|---|---|---|---|
| 8,947,987 | B1 | 2/2015 | Wang et al. |
| 9,159,350 | B1 | 10/2015 | Wang et al. |

(Continued)

FOREIGN PATENT DOCUMENTS

| | | |
|---|---|---|
| WO | 2021173170 A1 | 9/2021 |

OTHER PUBLICATIONS

Trinh, Tan D. et al., "Dependence of optical laser power on disk radius, head-disk spacing and media properties in heat-assisted magnetic recording", Microsystem Technologies; vol. 26; May 20, 2020; https://link.springer.com/article/10.1007/s00542-020-04881-y; 6 pages.

(Continued)

*Primary Examiner* — Nabil Z Hindi

(74) *Attorney, Agent, or Firm* — LOZA & LOZA, LLP; Gabriel Fitch

(57) ABSTRACT

Various apparatuses, systems, methods, and media are disclosed to provide a heat-assisted magnetic recording (HAMR) medium that includes a Co-rich Pt-doped capping material and a CoFe-based absorption layer. The absorption layer has a higher magnetization than the capping layer. Both layers include segregants such as BN, $SiO_2$, $B_2O_3$, and $ZrO_2$. In some examples, the volume percentage (vol. %) of segregants in the absorption layer is greater than the vol. % of segregants in the capping layer by, e.g., 5% to 15% to provide an increasing gradient in segregant percentage. The absorption layer may include two absorption sub-layers, one on top of the other, with the upper sub-layer having a greater vol. % of segregants than the lower absorption sub-layer to provide an additional gradient in segregant vol. %. In some examples, an etching process using a sacrificial layer is applied to the absorption layer to reduce head to media spacing.

33 Claims, 14 Drawing Sheets

(58) Field of Classification Search
CPC .............. G11B 5/73917; G11B 5/4826; G11B 20/1258; G11B 5/708; G11B 5/746; G11B 13/08
USPC ............................................................ 360/48
See application file for complete search history.

(56) References Cited

U.S. PATENT DOCUMENTS

| | | | | |
|---|---|---|---|---|
| 9,779,771 | B1 * | 10/2017 | Wang | G11B 5/72 |
| 9,886,977 | B1 | 2/2018 | Mryasov et al. | |
| 10,276,201 | B1 | 4/2019 | Srinivasan et al. | |
| 11,011,203 | B1 * | 5/2021 | Chang | G11B 13/08 |
| 12,260,889 | B1 | 3/2025 | Guo et al. | |
| 2004/0224185 | A1 | 11/2004 | Nakamura et al. | |
| 2011/0227179 | A1 | 9/2011 | Kitagawa et al. | |
| 2011/0311841 | A1 | 12/2011 | Saito et al. | |
| 2015/0138939 | A1 | 5/2015 | Hellwig et al. | |
| 2016/0133278 | A1 | 5/2016 | Cheng et al. | |
| 2020/0219534 | A1 | 7/2020 | Jones et al. | |
| 2022/0358963 | A1 | 11/2022 | Platt et al. | |
| 2024/0071416 | A1 | 2/2024 | Ho et al. | |

OTHER PUBLICATIONS

Tsai, Jai-Lin et al., “Surface modification of FePt(Ag, C) granular film by ultrathin B4C capping layer”, Applied Surface Science; vol. 509; Apr. 15, 2020; https://www.sciencedirect.com/science/article/abs/pii/S0169433220300933; 8 pages.

International Search Report and Written Opinion for Application No. PCT/US25/48497, dated Jan. 26, 2026, 11 pages.

* cited by examiner

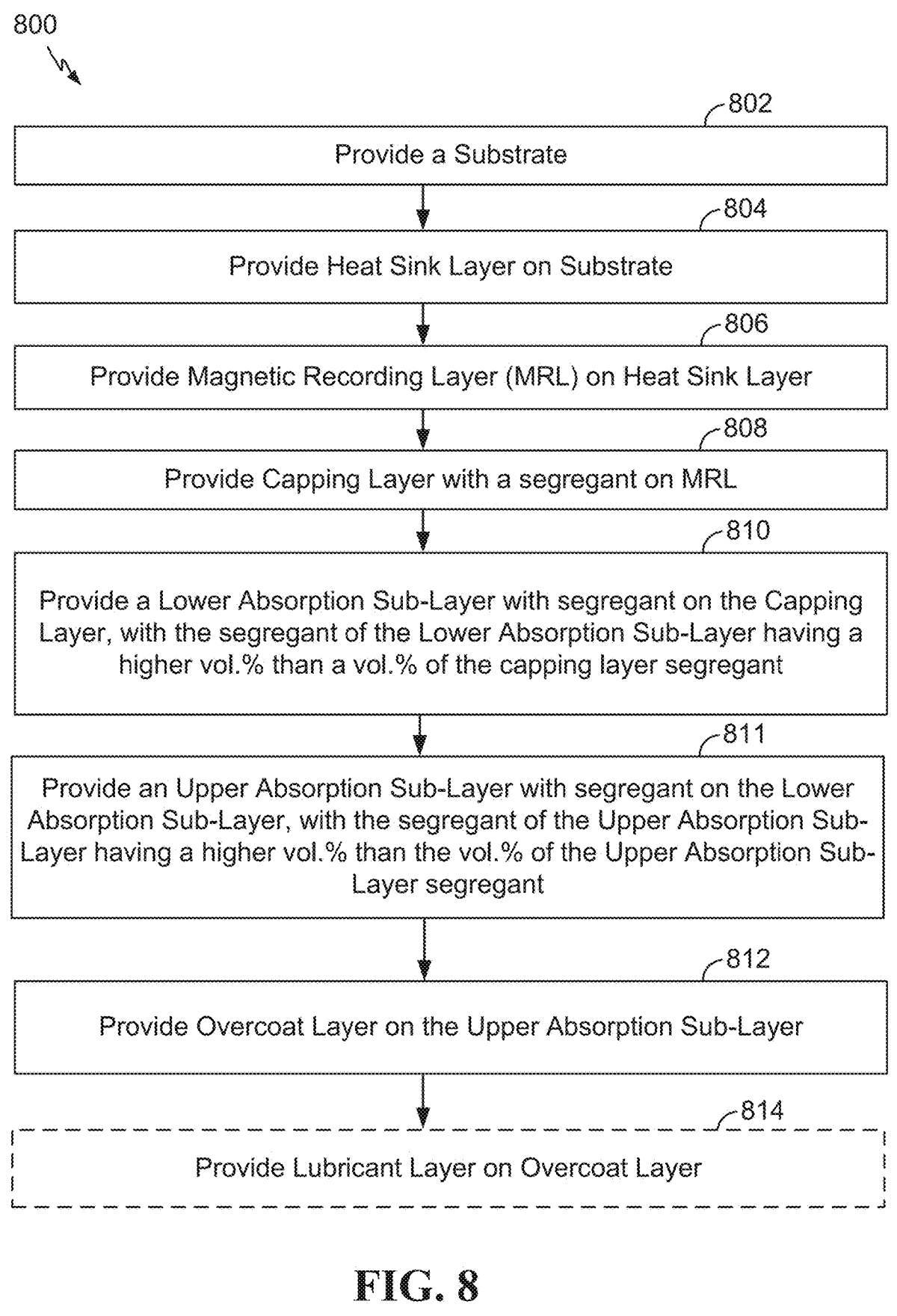

800

802 Provide a Substrate

804 Provide Heat Sink Layer on Substrate

806 Provide Magnetic Recording Layer (MRL) on Heat Sink Layer

808 Provide Capping Layer with a segregant on MRL

810 Provide a Lower Absorption Sub-Layer with segregant on the Capping Layer, with the segregant of the Lower Absorption Sub-Layer having a higher vol.% than a vol.% of the capping layer segregant 811 Provide an Upper Absorption Sub-Layer with segregant on the Lower Absorption Sub-Layer, with the segregant of the Upper Absorption Sub-Layer having a higher vol.% than the vol.% of the Upper Absorption Sub-Layer segregant 812 Provide Overcoat Layer on the Upper Absorption Sub-Layer 814 Provide Lubricant Layer on Overcoat Layer

FIG. 8

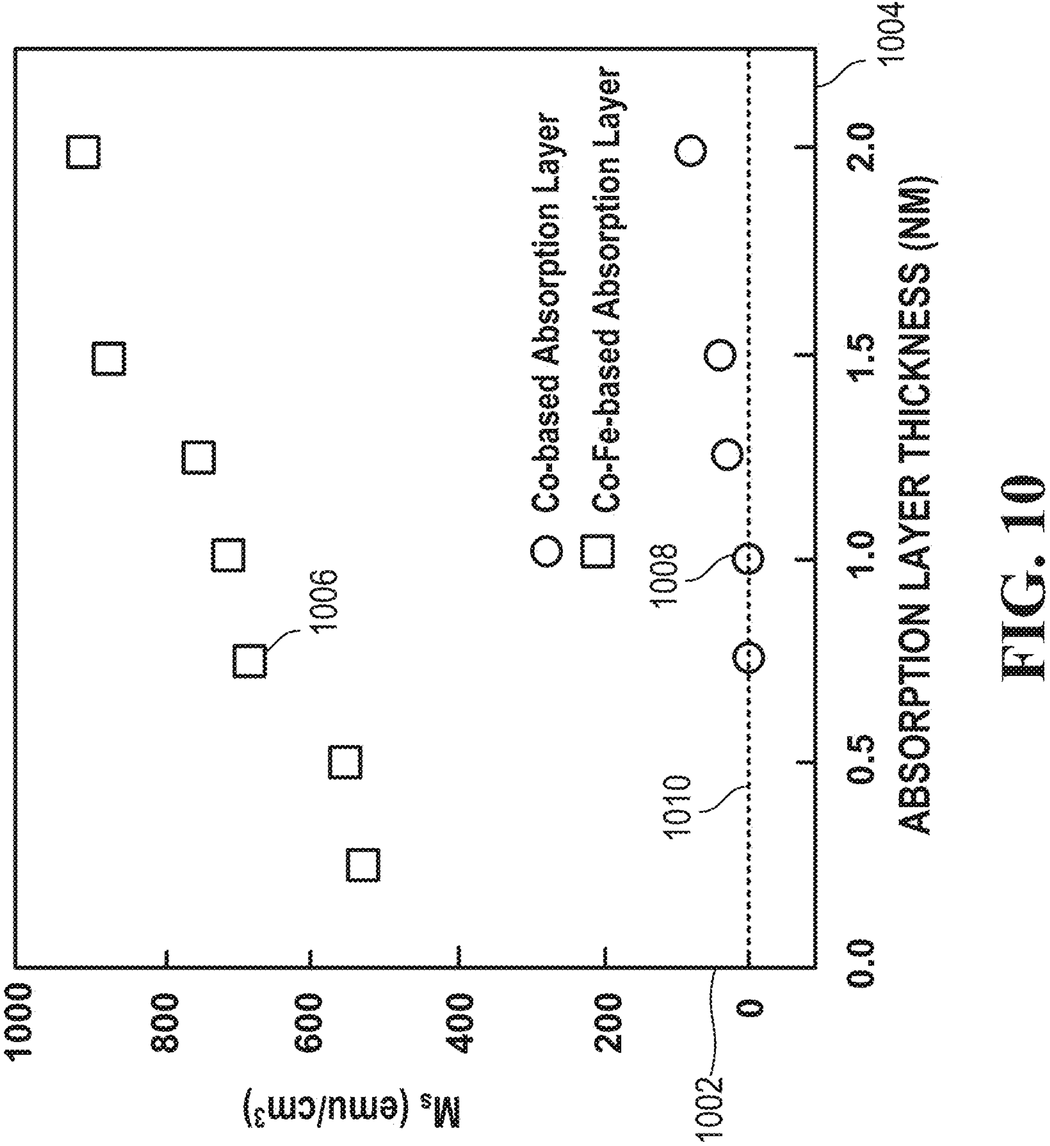
FIG. 10

MAGNETIC RECORDING MEDIA WITH HIGH MAGNETIZATION ABSORPTION LAYER AND GRADIENT SEGREGANT STRUCTURE

CLAIM OF PRIORITY UNDER 35 U.S.C. § 119

The present Application for Patent claims priority to Provisional Application No. 63/774,575, entitled "MAGNETIC RECORDING MEDIA WITH HIGH MAGNETIZATION ABSORPTION LAYER AND GRADIENT SEGREGANT STRUCTURE," filed Mar. 19, 2025, which is assigned to the assignee hereof and hereby expressly incorporated by reference herein.

FIELD

The disclosure relates, in some aspects, to magnetic recording media. More specifically, but not exclusively, the disclosure relates to magnetic recording media configured for use with heat assisted magnetic recording (HAMR).

INTRODUCTION

Magnetic storage systems, such as a hard disk drive (HDD), are utilized in a wide variety of devices in stationary and mobile computing environments. Examples of devices that incorporate magnetic storage systems include desktop computers, portable notebook computers, portable hard disk drives, high-definition television (HDTV) receivers, television set top boxes, video game consoles, and portable media players.

A typical disk drive includes magnetic storage media in the form of one or more flat disks. The disks are generally formed of a few main substances, namely, a substrate material that gives it structure and rigidity, a magnetic recording layer that holds the magnetic impulses or moments that store digital data, and media overcoat and lubricant layers to protect the magnetic recording layer. The typical disk drive also includes a read head and a write head, generally in the form of a magnetic transducer which can sense and/or change the magnetic moments stored on the recording layer of the disks.

Heat assisted magnetic recording (HAMR) systems can increase the areal density of information recorded magnetically on various magnetic media. To achieve higher areal density for magnetic storage, smaller magnetic grain sizes, e.g., less than 6 nanometers (nm), may be required. In HAMR, high temperatures are applied to the HAMR media during writing to facilitate recording to small magnetic grains. The high temperatures may be achieved using a near field transducer that is coupled to a laser diode of a slider within a HAMR disk drive.

At least some magnetic recording media for use with HAMR employ a capping layer over a granular magnetic recording layer that assists magnetization reversal of the magnetic grains in the granular magnetic recording layer. Both the magnetic recording layer and the capping layer may have segregants between magnetic grains. Aspects of the present disclosure are directed to configuring one or more additional layers on top of the capping layer, where the additional layers also have segregants with the segregants configured to help achieve overall improvements in areal density capability (ADC) of the HAMR media or to achieve other advantages and improvements.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, a magnetic recording medium includes: a substrate; a heat sink layer on the substrate; a magnetic recording layer (MRL) on the heat sink layer (e.g., an FePt MRL); a capping layer on the MRL, wherein the capping layer comprises a capping layer magnetic material that comprises CoPt; and an absorption layer on the capping layer, wherein the absorption layer comprises CoFe. In some aspects, the capping layer segregant comprises a first volume percentage of the capping layer (e.g., 30 vol. % to 45 vol. %) and the absorption layer segregant comprises a second volume percentage of the absorption layer that is greater than the first volume percentage by, e.g., at least 5 vol. %.

In another aspect, a magnetic recording medium includes: a substrate; a heat sink layer on the substrate; an MRL on the heat sink layer; a capping layer on the MRL, wherein the capping layer comprises a capping layer magnetic material and a capping layer segregant; and an absorption layer on the capping layer, wherein the absorption layer comprises an absorption layer magnetic material and an absorption layer segregant, with the absorption layer segregant configured to provide a gradient in the volume percentage of the absorption layer segregant with the volume percentage increasing from the capping layer. In some aspects, the absorption layer comprises first and second sub-layers, with a volume percentage of segregants in the second sub-layer is greater than a volume percentage of segregants in the first sub-layer percentage by, e.g., at least 5 vol. %.

In yet another aspect, the disclosure provides a method for fabricating a magnetic recording medium that includes: providing a substrate; providing a heat sink layer on the substrate; providing an MRL on the heat sink layer; providing a capping layer on the MRL, with the capping layer comprising a capping layer magnetic material that comprises CoPt; and providing an absorption layer on the capping layer, wherein the absorption layer comprises an absorption layer magnetic material that comprises CoFe.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations, it should be understood that such implementations can be implemented in various devices, systems, and methods.

BRIEF DESCRIPTION OF THE DRAWINGS

A more particular description is included below with reference to specific aspects illustrated in the appended drawings. Understanding that these drawings depict only certain aspects of the disclosure and are not therefore to be considered to be limiting of its scope, the disclosure is described and explained with additional specificity and detail through the use of the accompanying drawings, in which:

FIG. 8 is a flowchart of an exemplary process for fabricating a HAMR medium that includes first and second absorption sub-layers, wherein a volume percentage of segregants in the second sub-layer is greater than a volume percentage of segregants in the first sub-layer to provide a segregant gradient segregant structure, in accordance with an aspect of the disclosure.

FIGS. 9*a*-9*j* illustrate a sequence of cross-sectional views of a magnetic media workpiece, and corresponding actions performed on the magnetic media workpiece in a process for reducing the surface roughness of the magnetic media using selective etching of a sacrificial layer and an absorption layer, in accordance with an aspect of the disclosure.

FIG. 10 is a graph showing exemplary magnetization (Ms) for a HAMR medium with a CoFe-based absorption layer formed as compared to a Co-based absorption layer, in accordance with an aspect of the disclosure.

DETAILED DESCRIPTION

Figure 1:
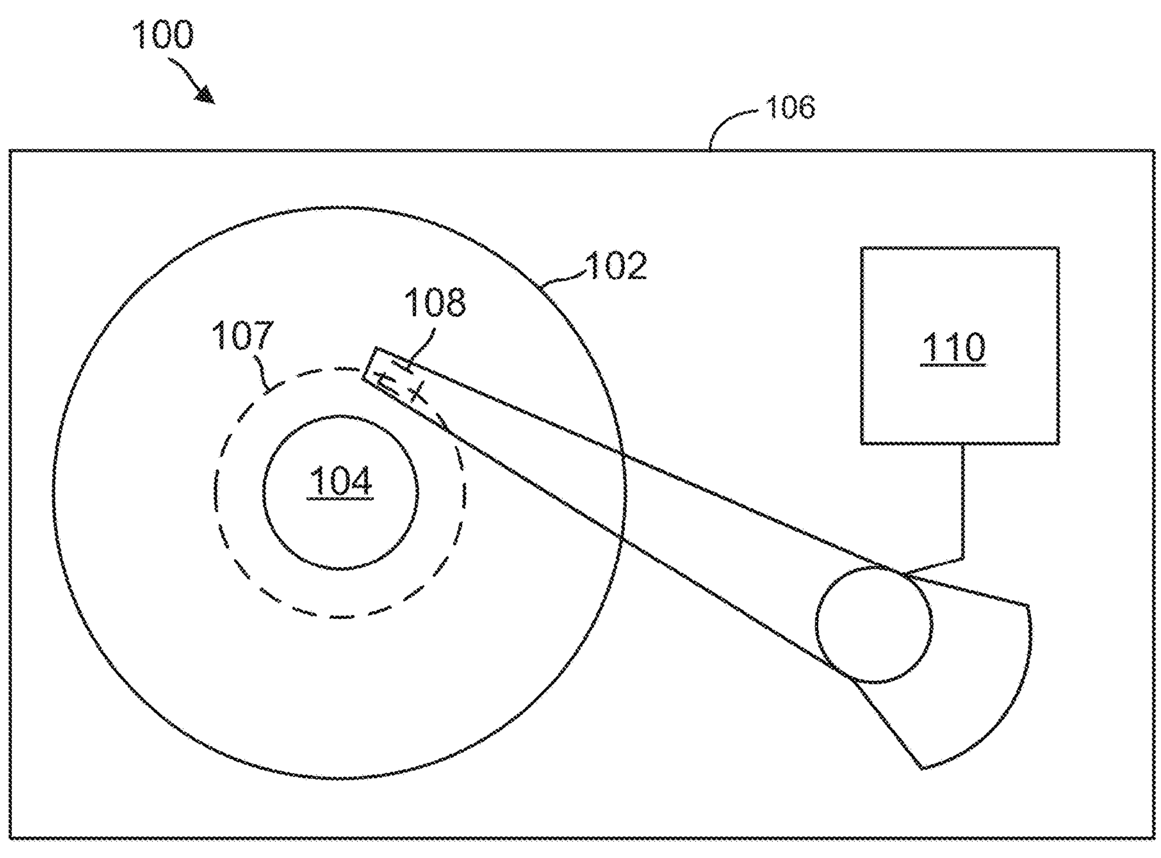
FIG. 1 is a top schematic view of an exemplary data storage device configured for heat-assisted magnetic recording (HAMR) including a slider and a HAMR medium with an absorption layer providing a gradient segregant structure, in accordance with an aspect of the disclosure.

In the following detailed description, reference is made to the accompanying drawings, which form a part thereof. In addition to the illustrative aspects, aspects, and features described above, further aspects, aspects, and features will become apparent by reference to the drawings and the following detailed description. The description of elements in each figure may refer to elements of proceeding figures. Like numbers may refer to like elements in the figures, including alternate aspects of like elements.

The disclosure relates in some aspects to various apparatuses, systems, methods, and media for providing a magnetic recording medium such as a Heat-Assisted Magnetic Recording (HAMR) medium that can, among other features, provide for optimized or at least improved magnetic performance within the HAMR medium. Note that HAMR is a type of Energy-Assisted Magnetic Recording (EAMR), which is a broader term that covers HAMR as well as Microwave Assisted Magnetic Recording (MAMR). At least some aspects of the present disclosure are not limited to HAMR and are applicable to EAMR.

As mentioned in the introduction above, at least some magnetic recording media for use with HAMR employ a capping layer over a granular magnetic recording layer (MRL). The capping layer assists the magnetization reversal of the magnetic grains in the granular MRL. Both the MRL and the capping layer may have segregants around and between the magnetic grains. For example, the MRL may be formed of FePt with segregants such as C, BN, $SiO_2$, Ag, and $TiO_2$. The capping layer may be formed of $Co_xFe_{100-x}$ (x=30-50%) with similar segregants. $Co_xFe_{100-x}$ is known to have the highest saturation magnetization (Ms) among CoFe alloys. Hence, CoFe can be used as a capping layer in HAMR. CoFe may achieve signal improvements relative to other capping layer compounds, but the signal-to-noise (SNR) of the media may be degraded due to the increase of lateral exchange coupling and thermal gradient degradation.

Herein, HAMR media are described that use a Co-rich Pt-doped capping material with segregants such as BN, $SiO_2$, and $ZrO_2$. By Co-rich, it is meant that the CoPt alloy has at least 80 mol. % of Co and no more than 20 mol. % of Pt (before the addition of segregants). The HAMR media also includes an absorption layer formed on top of the capping layer, where the absorption layer may be a CoFe-based layer such as CoFeBN, $CoFeSiO_2$, $CoFeB_2O_3$, or $CoFeZrO_2$. Firstly, the use of these segregants can help reduce the lateral exchange coupling that might otherwise occur in the CoFe. An elevated intergranular exchange coupling may have a dominant contribution to the SNR degradation. In this regard, for a fixed grain boundary width, the lateral exchange coupling between grains is known to increases with increasing grain core Ms. Thereby, in the case of CoFe, given the higher Ms of the grain core constituents, the grain boundary should be thicker to prevent an increase of the lateral exchange coupling. Secondly, those segregants have close-to-zero thermal conductivity and it acts as the thermal barrier that improves the thermal gradient of the media.

The absorption layer is referred to herein as an absorption layer since, among other functions, it absorbs some light (and heat) from the slider/head during a read/write operation. Other terminology may be used to refer to the absorption layer. For example, the absorption layer may be referred to instead as an additional capping layer because, like a capping layer, one of its functions is to assist in magnetization reversal of the magnetic grains in the MRL. The absorption layer may also be referred to as an enhancement layer since it tends to enhance the beneficial effects of the capping layer. It is noted that some HAMR media include non-magnetic absorption layers formed of W, Ta, or Ru, which are intended to enhance optical absorption, manage heat, protect underlying layers, and provide compatibility with a C overcoat. The absorption layers described herein may serve some or all of these functions as well.

In some aspects, the disclosed absorption layer has at least one different magnetic material (e.g., Fe) than the underlying capping layer (e.g. Pt), and the capping layer has at least one different magnetic material (e.g. Co) than the underlying MRL (e.g., Fe). In some aspects, the absorption layer may have at least one different segregant than the segregants of the underlying capping layer, and the capping layer may have at least one different segregant than the segregants of the underlying MRL. It is also noted that the segregants of the various layers are formed of different materials than the recording grains of the various layers to function as segregants.

In some aspects, since the absorption layer includes CoFe, whereas the capping layer includes CoPt, the absorption layer has a higher magnetization than the capping layer (since Fe is magnetic but Pt is not). In some examples, the magnetization of the CoFe-based absorption layer exceeds 900 kiloamperes/meter (kA/m), whereas that of the CoPt-based capping layer is 700 k A/m. In some aspects, the capping layer may also include CoFe in addition to or instead of CoPt. If both the capping layer and the absorption layer include CoFe, the relative molar percentages of Co and Fe within those two layers may differ from one another. For example, there may be less Fe within the CoFe of the capping layer than in the CoFe of the absorption layer. Furthermore, different segregants may be used in the layers, and different volume percentages (vol. %) of segregants may be provided.

In some aspects, the volume percentage (vol. %) of the segregants (BN, $SiO_2$, $B_2O_3$, and $ZrO_2$) within the absorption layer is greater than the vol. % of the segregants within the capping layer (BN, $SiO_2$, $B_2O_3$, and $ZrO_2$) by, e.g., 5% to 15%. This provides a significant increasing gradient in segregant percentage from the capping layer vertically through the absorption layer. By making the segregant vol. % of the capping layer at least 5% to 15% higher than the segregant vol. % of the capping layer alloys, the resulting HAMR media can achieve improvements in low frequency read/write signals, thermal gradient, read and write SNR, as well as provide an overall ADC gain. Some illustrative examples of the absorption layer material include 24.6Co-36.9Fe-38.5BN, 26Co-39Fe-35BN, 30Co-45Fe-25$ZrO_2$, 31Co-46.5Fe-22.5-$ZrO_2$, 34Co-51Fe-15$B_2O_3$, 32Co-48Fe-20$SiO_2$, and 33Co-49.5Fe-17.5$SiO_2$. These materials generally have a high magnetization due to the Co—Fe in the alloy (though moderated somewhat by the segregants). The materials also provide for a generally high magnetic saturation (Ms) during read/write operations. The high Ms enables strong vertical exchange coupling with the underlying capping layer and the MRL so that the magnetic grains in the absorption layer, the capping layer, and the MRL all switch at same time in response to the applied magnetic field during a read/write operation. Note that the segregants of the absorption layer may differ from the segregants of the capping layer. For example, the capping layer may use BN, whereas the absorption layer may use $SiO_2$. These are just some examples.

Still further, in some aspects, the absorption layer is configured with two absorption sub-layers, one on top of the other, with the upper absorption sub-layer having a greater vol. % of segregants than the lower absorption sub-layer (e.g. +5 vol. %), which in turn has a greater vol. % of segregants than the capping layer (e.g. +5 vol. %). This configuration provides an additional gradient in segregant vol. %, which can enhance the benefits of the gradient segregant structure. The segregants of the upper absorption sub-layer may differ from the segregants of the lower absorption sub-layer, which in turn may differ from the segregants of the capping layer and those of the MRL. For example, the capping layer may use BN, the upper absorption layer may use $SiO_2$, and the lower absorption layer may use $ZrO_2$. These are just some examples.

In some aspects, a sacrificial layer may be deposited on the absorption layer and then etched away to reduce the roughness of the top of the absorption layer. In this regard, head to media spacing should be minimized to achieve acceptable or optimized recording performance in magnetic media. Based on the uneven (e.g., rough) topology of magnetic grains grown at high temperatures for HAMR, challenges exist in reducing roughness at the media surface above the magnetic grains (e.g., media interface). Aspects of this disclosure relate to HAMR media including a sacrificial layer and an absorption layer, which are etched to reduce roughness and thereby increase smoothness at the media interface. The sacrificial layer is configured to ensure an etch rate that allows for selective etching (e.g., etching only selected components of the media such as the sacrificial layer and part of the absorption layer). The sacrificial layer may be deposited on the absorption layer and after etching (e.g., using plasma etching with a noble gas), may remain along grain boundaries of the absorption layer. The remaining portions of the sacrificial layer may form a discontinuous layer including a number of segments positioned along grain boundaries of the absorption layer. The sacrificial layer may be made of materials (e.g., a non-magnetic material) different from the materials of the capping layer or materials of an overcoat layer deposited on the etched absorption layer. In one aspect, the sacrificial layer may be embedded in the absorption layer at positions corresponding to the grain boundaries, where a top surface of the absorption layer (absorption layer grains in particular) and a top surface of the sacrificial layer are substantially coplanar.

Illustrative Examples and Embodiments

FIG. 1 is a top schematic view of an exemplary data storage device (e.g., disk drive or magnetic recording device) configured for heat-assisted magnetic recording (HAMR) including a slider 108 and a HAMR medium 102 with a high magnetization absorption layer configured with a gradient segregant structure, in accordance with an aspect of the disclosure. The laser (not visible in FIG. 1 but see 114 in FIG. 2) is positioned with a magnetic head/slider 108. Disk drive 100 may comprise one or more disks/media 102 to store data. Disk/media 102 resides on a spindle assembly 104 that is mounted to a drive housing 106. Data may be stored along tracks in the magnetic recording layer of disk 102. The reading and writing of data is accomplished with the head 108 (slider) that may have both read and write elements (108*a* and 108*b*). The write element 108*a* is used to alter the properties of the magnetic recording layer of disk 102 and thereby write information thereto. In one aspect, head 108 may have magneto-resistive (MR) based elements, such as tunnel magneto-resistive (TMR) elements for reading, and a write pole with coils that can be energized for writing. In operation, a spindle motor (not shown) rotates the spindle assembly 104, and thereby rotates the disk 102 to position the head 108 at a particular location along a desired disk track 107. The position of the head 108 relative to the disk 102 may be controlled by the control circuitry 110 (e.g., a microcontroller). It is noted that while an exemplary HAMR system is shown, at least some aspects of the disclosure may be used in other HAMR or EAMR magnetic data recording systems or in non-HAMR or non-EAMR magnetic data recording systems, including shingle-written magnetic recording (SMR) media, perpendicular magnetic recording (PMR) media, or microwave assisted magnetic recording (MAMR) media.

Figure 2:
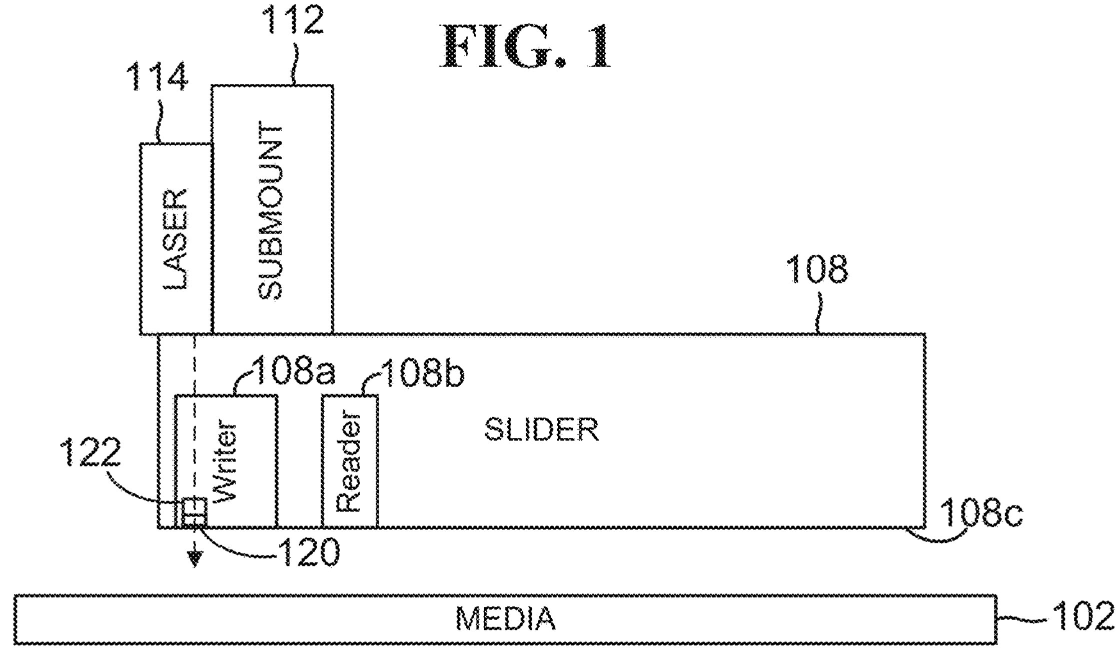
FIG. 2 is a side schematic view of the exemplary slider and HAMR medium of FIG. 1 in accordance with an aspect of the disclosure.

FIG. 2 is a side schematic view of the slider 108 and magnetic recording medium 102 of FIG. 1. The magnetic recording medium 102 includes the high magnetization absorption layer configured with a gradient segregant structure (which is not visible in FIG. 2, but see FIG. 3). The slider 108 may comprise a sub-mount 112 attached to a top surface of the slider 108. The laser 114 may be attached to the sub-mount 112, and possibly to the slider 108. The slider 108 comprises a write element (e.g., writer) 108*a* and a read element (e.g., reader) 108*b* positioned along an air bearing surface (ABS) 108*c* of the slider for writing information to, and reading information from, respectively, the media 102. In other aspects, the slider may also comprise a layer of Si or Si cladding 120. This layer is optional.

In operation, the laser 114 is configured to generate and direct light energy to a waveguide (e.g., along the dashed line) in the slider which directs the light to a near field transducer (NFT) 122 near the air bearing surface (e.g., bottom surface) 108*c* of the slider 108. Upon receiving the light from the laser 114 via the waveguide, the NFT 122 generates localized heat energy that heats a portion of the media 102 within or near the write element 108*a*, and near the read element 108*b*. The anticipated recording temperature is in the range of about 350° C. to 400° C. In the aspect illustrated in FIG. 2, the laser directed light is disposed within the writer 108*a* and near a trailing edge of the slider. In other aspects, the laser directed light may instead be positioned between the writer 108*a* and the reader 108*b*. FIGS. 1 and 2 illustrate a specific example of a HAMR system. In other examples, the magnetic recording medium 102 can be used in other suitable HAMR systems (e.g., with other sliders configured for HAMR).

Figure 3:
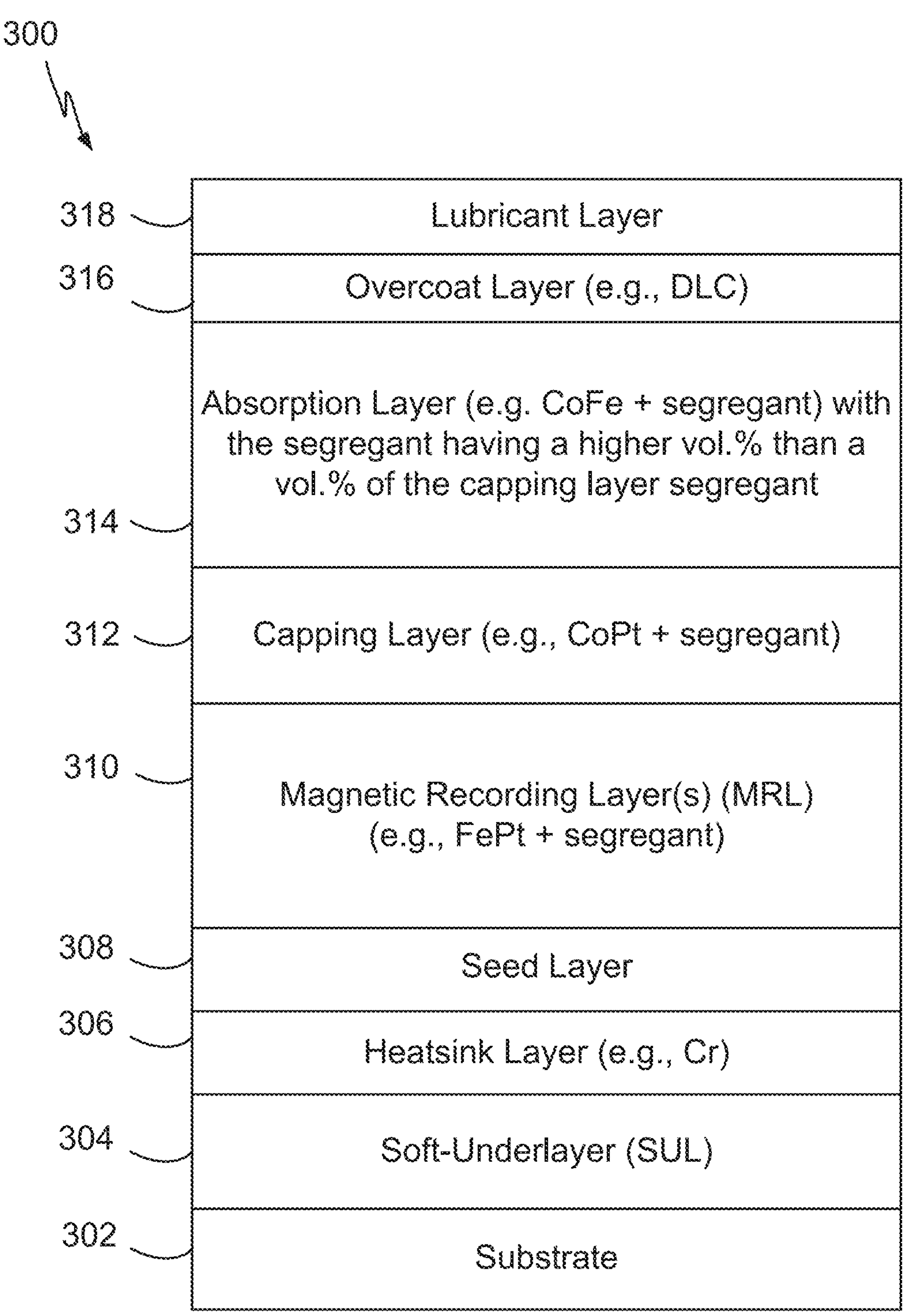
FIG. 3 is a side schematic view of an exemplary HAMR medium that includes, among other layers, a capping layer and an absorption layer, wherein the absorption layer has a segregant having a higher volume percentage (vol. %) than a vol. % of a capping layer segregant to provide a gradient segregant structure, in accordance with an aspect of the disclosure.

FIG. 3 is a side schematic view of an exemplary HAMR medium 300 that includes, among other layers, a high magnetization absorption layer 314 and a capping layer 312, which provide a gradient segregant structure in accordance with an aspect of the disclosure. The HAMR medium 300 of FIG. 3 has a stacked structure with a substrate 302 at a bottom/base layer, a soft underlayer (SUL) 304 on the substrate 302, a heatsink layer 306 (which may be formed, e.g., of Cr) on the SUL 304, a seed layer 308 on the heatsink layer 306, a magnetic recording layer (MRL) 310 (which may be formed of magnetic grains, e.g., FePt, and one or more segregants) on the seed layer 308, the capping layer 312 (e.g., a Co-rich CoPt with one or more segregants) on the MRL 310, the absorption layer 314 on the capping layer 312, an overcoat layer 316 (e.g., made of diamond like carbon (DLC) or other suitable materials) on the absorption layer 314, and a lubricant layer 318 on the overcoat layer 316.

The absorption layer 314 may be, for example, formed of CoFe with a segregant having a higher vol. % than the vol. % of the capping layer 312 segregant. For example, the vol. % of the segregant of the absorption layer 314 may be 5% to 15% greater than the vol. % of the segregant of the capping layer 312, which may be, e.g., in the range of 30 vol. % to 45 vol. %. For example, if the segregants of the capping layer 312 provide 30 vol. % of the capping layer material, then the segregants of the absorption layer 314 are configured to provide more than 35 vol. % of the absorption layer material, thus providing a gradient in vol. % of greater than 5 vol. %. In other examples, described below, the absorption layer 314 has an internal segregant gradient achieved by, e.g., forming two sub-layers within the absorption layer that have different segregant volume percentages. Still further, one or more sacrificial layers may be used during fabrication, which are then etched away, leaving discontinuous sacrificial layer portions.

In some aspects, the HAMR medium 300 can include additional layers. In one example, the HAMR medium 300 also includes an adhesion layer (which may be formed, e.g., of NiTa) on the substrate 302 and under the SUL 304. In one example, the HAMR medium 300 also includes a (heatsink) seed layer (which may be formed, e.g., of RuAl) on the SUL 304 and under the heatsink layer 306.

Note that the terms "above," "below," "on," and "between" as used herein refer to a relative position of one layer with respect to other layers. As such, one layer deposited or disposed on, above, or below another layer may be directly in contact with the other layer or may have one or more intervening layers. Moreover, one layer deposited or disposed between layers may be directly in contact with the layers or may have one or more intervening layers.

Figure 4:
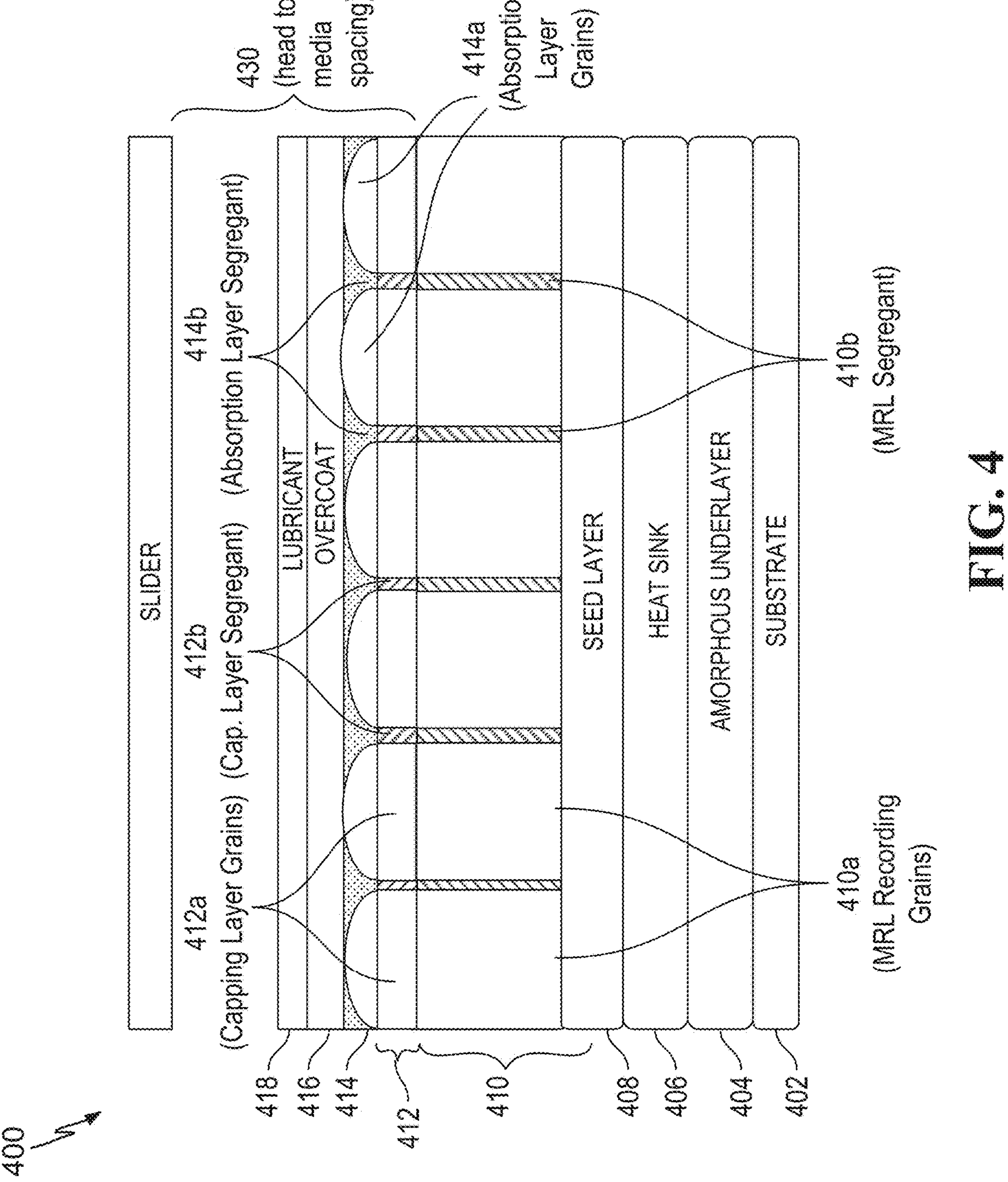
FIG. 4 is another side schematic view of an exemplary HAMR medium that includes, among other layers, a capping layer and an absorption layer, wherein the absorption layer has a segregant having a higher vol. % than a vol. % of a capping layer to provide a segregant gradient segregant structure, in accordance with an aspect of the disclosure.

FIG. 4 is a side schematic view of an exemplary HAMR medium 400 that includes, among other layers, a single absorption layer 414 and a capping layer 412, in accordance with an aspect of the disclosure. Similar to the HAMR medium of FIG. 3, the HAMR medium 400 of FIG. 4 has a stacked structure with a substrate 402 at a bottom/base layer, a soft/amorphous underlayer (SUL) 404 on the substrate 402, a heatsink layer 406 (which may be made, e.g., of Cr) on the SUL 404, a seed layer 408 on the heatsink layer 406, a magnetic recording layer (MRL) 410 (which may be formed of magnetic grains 410*a* (e.g., FePt) and one or more segregants 410*b*) on the seed layer 408, the capping layer 412 (which may be formed of magnetic material capping grains 412*a* (e.g., CoPt) on the MRL grains 410*a* and one or more segregants 412*b*, e.g., BN, $SiO_2$, $B_2O_3$, and $ZrO_2$) on the MRL 410, the absorption layer 414 (which may be formed of magnetic materials 414*a* (absorption grains, e.g., CoFe) on the capping grains 412*a* and one or more segregants 414*b*, e.g., BN, $SiO_2$, $B_2O_3$, and $ZrO_2$)) on the capping layer 412, an overcoat layer 416 (e.g., made of diamond like carbon (DLC) or other suitable materials) on the absorption layer 414, and a lubricant layer 418 on the overcoat layer 416. The volume percentage (vol. %) of the segregants 414*b* within the absorption layer is greater than the vol. % of the segregants 412*b* within the capping layer by, e.g., 5% to 15%. This provides for a significant increasing gradient in segregant percentage from the capping layer 412 vertically through the absorption layer 414. (Note that the figure is not to scale and does not necessarily illustrate the listed percentage differences.) In examples where one or more sacrificial layers are used during fabrication and then etched away, fragments of the sacrificial layer main remain after etching, which are not shown in FIG. 4.)

In some aspects, the layers in the medium may have the following thicknesses: the substrate 302/402 thickness is in the range of 0.5 millimeters (mm) to 0.635 mm; the SUL 304/404 thickness is in the range of 85 nanometers (nm) to 130 nm; the heatsink layer 306/406 thickness is in the range of 55 nm to 100 nm; the seed layer 308/408 has a thickness is in the range of 1 to 4 nm; the MRL 310/410 thickness is in the range of 8 nm to 11 nm; the capping layer 312/412 thickness is in the range of 1 nm to 3 nm; the absorption layer 314/414 is less than 1.0 nm and, e.g., in in the range of 0.25 nm to 1.0 nm; the overcoat layer 416 thickness is in the range of 20 Å to 50 Å; the lubricant layer thickness (if provided) is in the range of 6 Å to 9 Å. Otherwise routine experimentation can be used to determine suitable or preferred layer thicknesses and/or suitable or preferred compound percentage concentrations for use within practical HAMR systems based on the particular characteristics of the system, such as its operating temperature, the desired areal density of data, etc.

In some examples, the substrate 302/402 has an outer diameter (i.e., OD) of about 97 mm and a thickness of about 0.5 mm. In other examples, the OD may be 95 mm or 95.1 mm. (Generally speaking, such disks are all referred to as "3.5 inch" disks.) In some aspects, the substrate 302/402 may be made of one or more materials such as glass, glass ceramic, and/or combinations thereof.

In some aspects, the medium further includes an adhesion layer (which might alternatively be referred to as a pre-seed layer) that is used to reduce delamination of layers or films deposited over the adhesion layer. The adhesion layer may be a metallic alloy, such as NiTa, CrTi, or the like.

In some aspects, the SUL 304/404 can be made of one or more materials, such as Co, Fe, Mo, Ta, Nb, B, Cr, or other soft magnetic materials, or combinations thereof. The SUL 304/404 may include an amorphous compound or combination of Co and Fe (e.g., a CoFe alloy) with the addition of one or more elements from Mo, Nb, Ta, W, and B. The SUL 304/404 may be configured to support magnetization of the magnetic recording layer structure 310/410 during data storage operations. More specifically, the SUL 304/404 may be configured to provide a return path for a magnetic field applied during a write operation.

In some aspects, the medium further includes a (heatsink) seed layer to create a growth template for the subsequently deposited films including the heatsink layer 306/406 and the MRL 310/410. Functional goals for the (heatsink) seed layer include small grain size and good crystallographic texture, both of which may be desirable for good media recording performance.

In some aspects, the heatsink layer 306/406 can be made of one or more materials such as Cr, as shown, or Ag, Al, Au, Cu, Mo, Ru, W, CuZr, MoCu, AgPd, CrRu, CrV, CrW, CrMo, CrNd, NiAl, NiTa, combinations thereof, and/or other suitable materials known in the art.

In some aspects, the medium further includes a thermal resistive layer deposited directly on the heatsink layer 306/406 to provide thermal resistance to the heatsink layer. The thermal resistive layer may be etched to reduce roughness.

In some aspects, the seed layer 308/408 is provided as a seed layer for the MRL 310/410 to provide a thermal barrier and to assist in nucleation so as to permit proper crystal growth within the MRL 310/410 so that the MRL 310/410 will have good crystallographic texture with small grains. The seed layer 308/408 may be made of MgOTiO (MTO) or possibly MgO. In one aspect, the seed layer may be implemented using multiple layers (e.g., multiple MTO layers or combinations of MgO layers and MTO layers).

In some aspects, the MRL 310/410 includes one or more magnetic recording layers (multiple layers not explicitly shown in FIGS. 3 and 4) for storing data magnetically. For example, the MRL 310/410 may include magnetic recording sub-layers and exchange control sub-layers (ECLs). Collectively, the sub-layers form an MRL structure 310/410 that may be, e.g., 100-200 angstroms (Å) thick. In some aspects, the MRL 310/410 may be made of FePt. In some aspects, the MRL 310 may be made instead of an alloy selected from FePtY, where Y is a material selected from Cu, Ni, and combinations thereof. In other aspects, the MRL 310/410 may be made instead of a CoPt alloy. In some aspects, the MRL 310/410 may be formed of high anisotropy Llo FePt with segregants such as C, BN, $SiO_2$, Ag, TiO2, and/or combinations thereof. In some aspects, the MRL is a four layer MRL. Each layer of the MRL may have segregants with the amount of segregant varying from layer to layer within the MRL.

In one aspect, the overcoat 316/416 is made of amorphous hydrogenated carbon such as DLC or non-hydrogenated tetrahedral amorphous carbon (ta-C). In some aspects, the lubricant layer may be made of a polymer-based lubricant material.

Figure 5:
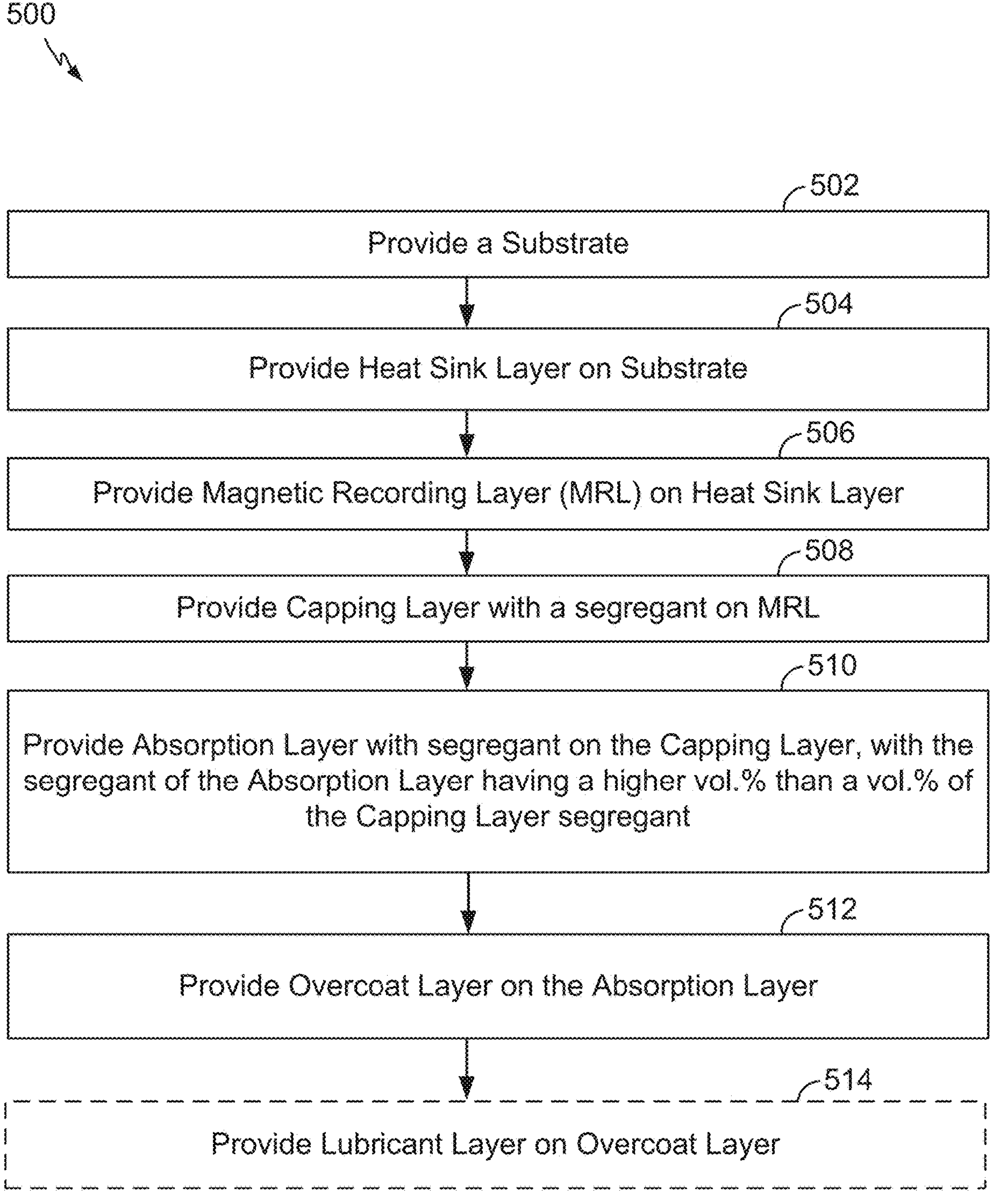
FIG. 5 is a flowchart of an exemplary process for fabricating a HAMR medium that includes a capping layer and an absorption layer, wherein the absorption layer has a segregant having a higher vol. % than a vol. % of a capping layer segregant to provide a segregant gradient segregant structure, in accordance with an aspect of the disclosure.

FIG. 5 is a flowchart of an exemplary process 500 for fabricating a HAMR medium that includes an absorption layer and a capping layer, in accordance with an aspect of the disclosure. In one aspect, the process 500 can be used to fabricate any of the HAMR media described above, including, for example, HAMR mediums 102, 300, and 400.

At block 502, the process provides a substrate (e.g., 302, 402). At block 504, the process provides a heatsink layer (e.g., 306, 406) on the substrate. In one aspect, the process may additionally provide a soft magnetic underlayer (SUL, e.g., 304, 404) on the substrate and provides the heatsink layer on the SUL. At block 506, the process provides a magnetic recording layer (MRL, e.g., 310, 410) on the heatsink layer. In one aspect, the process may additionally provide a seed layer (e.g., 308, 408) on the heatsink layer and then provides the MRL on the seed layer. At block 508, the process provides a capping layer (e.g., 312, 412) with segregant (e.g., 412*b*) on the MRL. The segregant of the capping layer forms a vol. % of the capping layer, e.g., in the range of 30 vol. % to 45 vol. % (but sometimes may be in a wider range of, e.g., 10 vol. % to 50 vol. %). At block 502, the process provides an absorption layer (e.g., 314, 414) with segregant (e.g., 414*b*) on the capping layer, with the segregant of the absorption layer having a higher vol. % than the vol. % of the capping layer segregant. For example, the vol. % of the segregant of the absorption layer may be 35 vol. % whereas the vol. % of the capping layer may be 30 vol. %. As such, there is a significant increasing gradient in segregant percentage from the capping layer vertically through the absorption layer. At block 512, the process provides an overcoat layer (e.g., 316, 416) on the absorption layer. At optional block 514, the process provides a lubricant layer (e.g., 318, 418) on the overcoat layer. Exemplary materials for the various layers are described above.

Insofar as the processes described herein are concerned, a process can in some cases perform the sequence of actions in a different order. In another aspect, the process can skip one or more of the actions. In other aspects, one or more of the actions are performed simultaneously. In some aspects, additional actions can be performed. Unless otherwise indicated, the deposition of (or providing of) at least some of the layers can be performed using any of a variety of deposition processes or sub-processes, including, but not limited to physical vapor deposition (PVD), sputter deposition and ion beam deposition, plasma enhanced chemical vapor deposition (PECVD) and other forms of chemical vapor deposition (CVD), low pressure chemical vapor deposition (LPCVD) and atomic layer chemical vapor deposition (ALCVD). In other aspects, other suitable deposition techniques known in the art might also be used.

TABLE I illustrates exemplary compounds that may be used as the absorption layer, including the vol. % of the segregants of the compound and suitable deposition temperatures.

TABLE I

| Absorption Layer Alloys (in mol. %) | In Vol % BN | Co | $SiO_2$ | $ZrO_2$ | Fe | Deposition Temperature (C.) | Layer Thickness (nm) |
|---|---|---|---|---|---|---|---|
| 24.6Co-36.9Fe-38.5BN | 50.0 | 19.0 | | | 31.0 | 150-250 | <1 |
| 26Co-39Fe-35BN | 46.0 | 20.7 | | | 33.3 | 150-250 | <1 |
| 30Co-45Fe-25$ZrO_2$ | | 19.4 | | 49.3 | 31.2 | 250-300 | <1 |
| 31Co-46.5Fe-22.5$ZrO_2$ | | 20.7 | | 45.9 | 33.4 | 250-300 | <1 |
| 32Co-48Fe-20$SiO_2$ | | 19.3 | 49.7 | | 31.0 | 300-500 | <1 |
| 33Co-49.5Fe-17.5$SiO_2$ | | 20.8 | 45.6 | | 33.6 | 300-500 | <1 |

Figure 6:
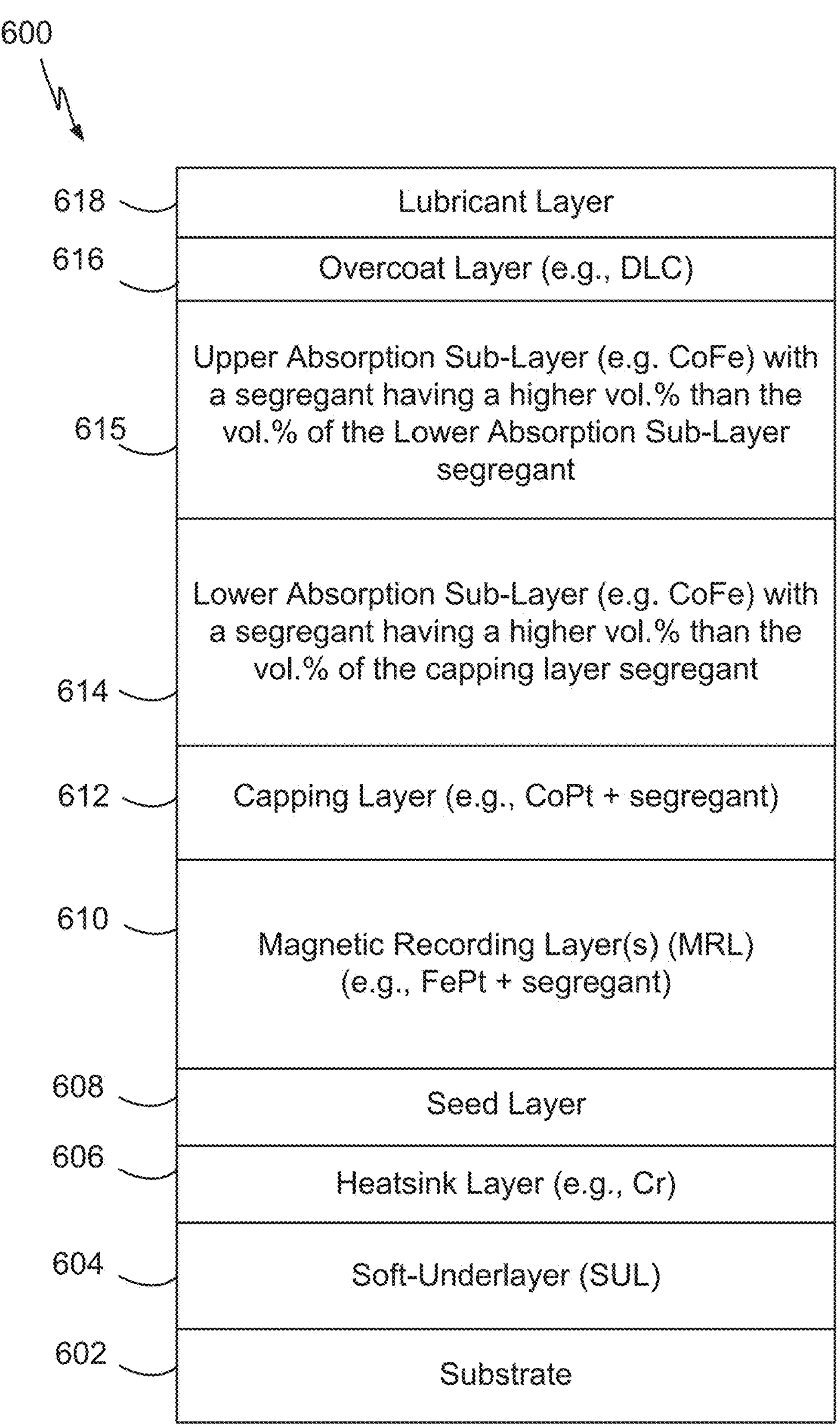
FIG. 6 is a side schematic view of an exemplary HAMR medium that includes, among other layers, first and second absorption sub-layers, wherein a volume percentage of segregants in the second sub-layer is greater than a volume percentage of segregants in the first sub-layer to provide a segregant gradient segregant structure, in accordance with an aspect of the disclosure.

FIG. 6 is a side schematic view of an exemplary HAMR medium 600 that includes, among other layers, a pair of high magnetization absorption sub-layers 614, 615 and a capping layer 612, which provide a gradient segregant structure in accordance with an aspect of the disclosure. The two absorption sub-layers may be referred to instead as two distinct absorption layers. The HAMR medium 600 of FIG. 6 has a stacked structure with a substrate 602 at a bottom/base layer, a soft underlayer (SUL) 604 on the substrate 602, a heatsink layer 606 (which may be formed, e.g., of Cr) on the SUL 604, a seed layer 608 on the heatsink layer 606, a magnetic recording layer (MRL) 610 (which may be formed of magnetic grains (e.g., FePt) and one or more segregants) on the seed layer 608, the capping layer 612 (e.g., a Co-rich CoPt with one or more segregants) on the MRL 610, a first or lower absorption sub-layer 614 on the capping layer 612, a second or upper absorption sub-layer 615 on the lower absorption sub-layer 614, an overcoat layer 616 (e.g., made of DLC or other suitable materials) on the upper sub-layer 615, and a lubricant layer 618 on the overcoat layer 616.

The lower absorption sub-layer 614 may be, for example, formed of CoFe with a segregant having a higher vol. % than the vol. % of the capping layer 612 segregant. For example, the vol. % of the segregant of the absorption sub-layer 614 may be 5% to 15% greater than the vol. % of the segregant of the capping layer 612. For example, if the segregants of the capping layer 612 provide 5 vol. % of the capping layer material, then the segregants of the lower absorption sub-layer 614 are configured to provide more than 10 vol. % of the absorption layer material, thus providing a gradient in vol. % of at least 5 vol. %. Likewise, the upper absorption sub-layer 615 may be, for example, formed of CoFe with a segregant having a higher vol. % than the vol. % of the lower absorption sub-layer 614 segregant. For example, the vol. % of the segregant of the upper absorption sub-layer 614 may be 5% to 15% greater than the vol. % of the segregant of the lower absorption sub-layer 614. For example, if the segregants of the lower absorption sub-layer 614 provide 35 vol. % of the lower absorption sub-layer material, then the segregants of the upper absorption sub-layer 615 are configured to provide 40 vol. % or more of the absorption layer material, thus providing a further gradient in vol. % of at least 5 vol. %. Still further, one or more sacrificial layers may be used during fabrication, which are then etched away, leaving discontinuous sacrificial layer portion, not shown in FIG. 6.

In some aspects, the HAMR medium 600 can include additional layers. In one example, the HAMR medium 600 also includes an adhesion layer (which may be formed, e.g., of NiTa) on the substrate 602 and under the SUL 604. In one example, the HAMR medium 600 also includes a (heatsink) seed layer (which may be formed, e.g., of RuAl) on the SUL 604 and under the heatsink layer 606.

Figure 7:
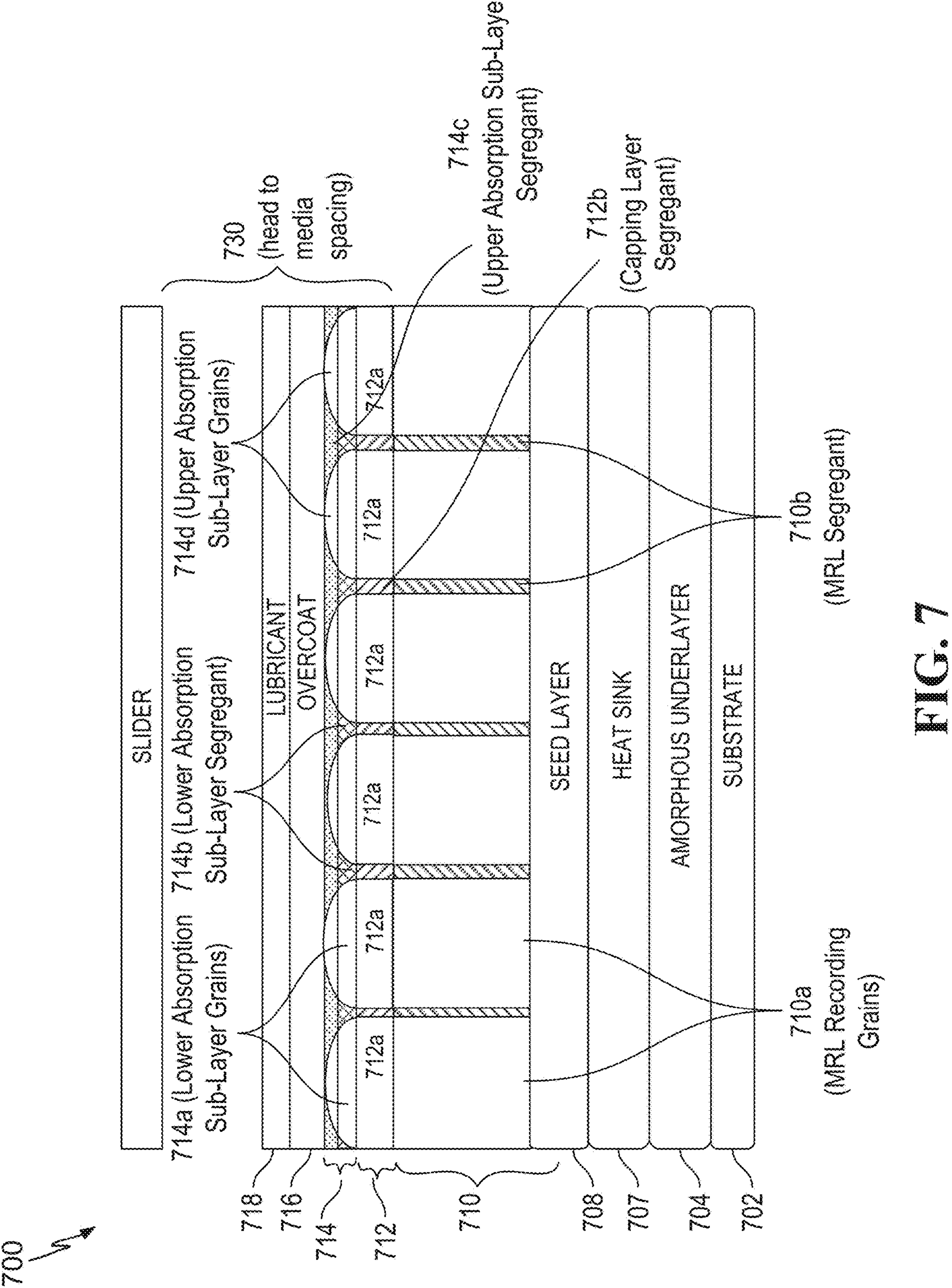
FIG. 7 is another side schematic view of an exemplary HAMR medium that includes, among other layers, first and second absorption sub-layers, wherein a volume percentage of segregants in the second sub-layer is greater than a volume percentage of segregants in the first sub-layer to provide a segregant gradient segregant structure, in accordance with an aspect of the disclosure.

FIG. 7 is a side schematic view of an exemplary HAMR medium 700 that includes, among other layers, a pair of absorption sub-layers 714 and a capping layer 712, in accordance with an aspect of the disclosure. The pair of absorption sub-layers 714 may be referred to herein as lower and upper absorption sub-layers. Similar to the HAMR medium of FIG. 6, the HAMR medium 700 of FIG. 7 has a stacked structure with a substrate 702 at a bottom/base layer, an SUL 704 on the substrate 702, a heatsink layer 706 (which may be made, e.g., of Cr) on the SUL 704, a seed layer 708 on the heatsink layer 706, a magnetic recording layer (MRL) 710 (which may be formed of magnetic grains 710*a* (e.g., FePt) and one or more segregants 710*b*) on the seed layer 708, and the capping layer 712 (which may be formed of magnetic material capping grains 712*a* (e.g., CoPt) on the MRL grains 710*a* and one or more segregants 712*b*, e.g., BN, $SiO_2$, $B_2O_3$, and $ZrO_2$) on the MRL 710. The absorption layer 714 has a lower or first sub-layer that includes magnetic absorption layer grains 714*a* (lower sub-layer absorption grains, e.g., CoFe, formed on the capping grains 712*a* of the capping layer 712) separated by segregants 714*b* (lower sub-layer segregants, e.g., BN, $SiO_2$, $B_2O_3$, and $ZrO_2$ formed on the segregants 712*b* of the capping layer 712). The absorption layer 714 has an upper or second sub-layer that includes magnetic absorption layer grains 714*d* (upper sub-layer absorption grains, e.g., CoFe, formed on the lower sub-layer grains 714*a*) separated by segregants 714*c* (upper sub-layer segregants, e.g., BN, $SiO_2$, $B_2O_3$, and $ZrO_2$, formed on the lower sub-layer segregants 714*b*). An overcoat layer 716 (e.g., made of diamond like carbon (DLC) or other suitable materials) is on the top layer of the upper absorption sub-layer. A lubricant layer 718 is on the overcoat layer 716.

The volume percentage (vol. %) of the segregants 714*b* within the upper absorption sub-layer is greater than the vol. % of the segregants 714*c* of the lower absorption sub-layer by, e.g., 5% to 15%. This provides for a significant increasing gradient in segregant percentage from the lower absorption layer vertically through the upper absorption layer. Still further, the volume percentage (vol. %) of the segregants 714*c* within the lower absorption sub-layer is greater than the vol. % of the segregants 712*b* of the capping layer 712 by, e.g., 5% to 15%. This provides for an additional increasing gradient in segregant percentage from the capping layer vertically through the lower absorption sub-layer and through the upper absorption sub-layer. (Note that the figures herein are not to scale and do not necessarily illustrate the listed percentage differences.) In examples where one or more sacrificial layers are used during fabrication and then etched away, fragments of the sacrificial layer main remain after etching, which are not shown in FIG. 7.) The exemplary materials and exemplary layer thicknesses listed above for the HAMR media may also apply to FIG. 7. In some examples, the absorption layer 714 may be 1 nm with each sub-layer being 0.5 nm. In other examples, the absorption layer 714 may be greater than 1 nm (e.g. 1.5 nm) with each sub-layer being 0.75 nm. These are just some examples.

FIG. 8 is a flowchart of an exemplary process 800 for fabricating a HAMR medium that includes a pair of absorption sub-layers and a capping layer, in accordance with an aspect of the disclosure. In one aspect, the process 800 can be used to fabricate the HAMR media described above, including, for example, HAMR media 600 and 700.

At block 802, the process provides a substrate (e.g., 602, 702). At block 804, the process provides a heatsink layer (e.g., 606, 706) on the substrate. In one aspect, the process may additionally provide a soft magnetic underlayer (SUL, e.g., 604, 704) on the substrate and provides the heatsink layer on the SUL. At block 806, the process provides a magnetic recording layer (MRL, e.g., 610, 710) on the heatsink layer. In one aspect, the process may additionally provide a seed layer (e.g., 608, 708) on the heatsink layer and then provides the MRL on the seed layer. At block 808, the process provides a capping layer (e.g., 612, 712) with segregant (e.g., 712*b*) on the MRL. The segregant of the capping layer forms a vol. % of the capping layer of, e.g., 5 vol. %. At block 810, the process provides a first or lower absorption sub-layer (e.g., 614, 714) with segregant (e.g., 714*b*) on the capping layer, with the segregant of the lower absorption sub-layer having a higher vol. % than the vol. % of the capping layer segregant. For example, the vol. % of the segregant of the absorption sub-layer may be 35 vol. % whereas the vol. % of the capping layer may be 30 vol. %.

At block 811, the process provides a second or upper absorption sub-layer (e.g., 614, 714) with segregant (e.g., 714*c*) on the lower absorption sub-layer, with the segregant of the upper absorption sub-layer having a higher vol. % than the vol. % of the lower absorption sub-layer segregant. For example, the vol. % of the segregant of the upper absorption sub-layer may be 35 vol. % whereas the vol. % of the lower absorption sub-layer may be 30 vol. %.

As such, there is a significant increasing gradient in segregant percentage from the capping layer vertically through both of the absorption sub-layers.

At block 812, the process provides an overcoat layer (e.g., 616, 716) on the upper absorption sub-layer. At optional block 814, the process provides a lubricant layer (e.g., 618, 618) on the overcoat layer. Exemplary materials for the various layers are described above.

In some aspects, a sacrificial layer may be used during fabrication of the media with selective etching of the sacrificial layer and the absorption layer. This is described in the following with respect to an example having a single absorption layer (rather than two sub-layers).

FIGS. 9*a*-9*i* illustrate a sequence of cross-sectional views of a magnetic media workpiece 900, and corresponding actions performed on the magnetic media workpiece 900 in a process for reducing the surface roughness of the magnetic media using selective etching of the sacrificial layer and absorption layer in accordance with an aspect of the disclosure.

In FIG. 9*a*, the process first provides (950) a substrate 902. Substrate 902 could be implemented with any of the substrates 302/402 described above.

In FIG. 9*b*, the process provides (952) a soft underlayer 904 on the substrate 902. The soft underlayer 904 could be made of any of the materials described above for soft underlayers 304/404. In one aspect, the process deposits the soft underlayer 904 using any of the deposition techniques described above.

In FIG. 9*c*, the process provides (954) a heat sink layer 906 on the soft underlayer 904. The heat sink layer 906 could be made of any of the materials described above for heat sink layers 306/406. In one aspect, the process deposits the heat sink layer 906 using any of the deposition techniques described above.

In FIG. 9*d*, the process provides (956) a seed layer 908 on the heat sink layer 906. The seed layer 908 could be made of any of the materials described above for seed layers 308/408. In one aspect, the process deposits the seed layer 908 using any of the deposition techniques described above.

Figure 9E:
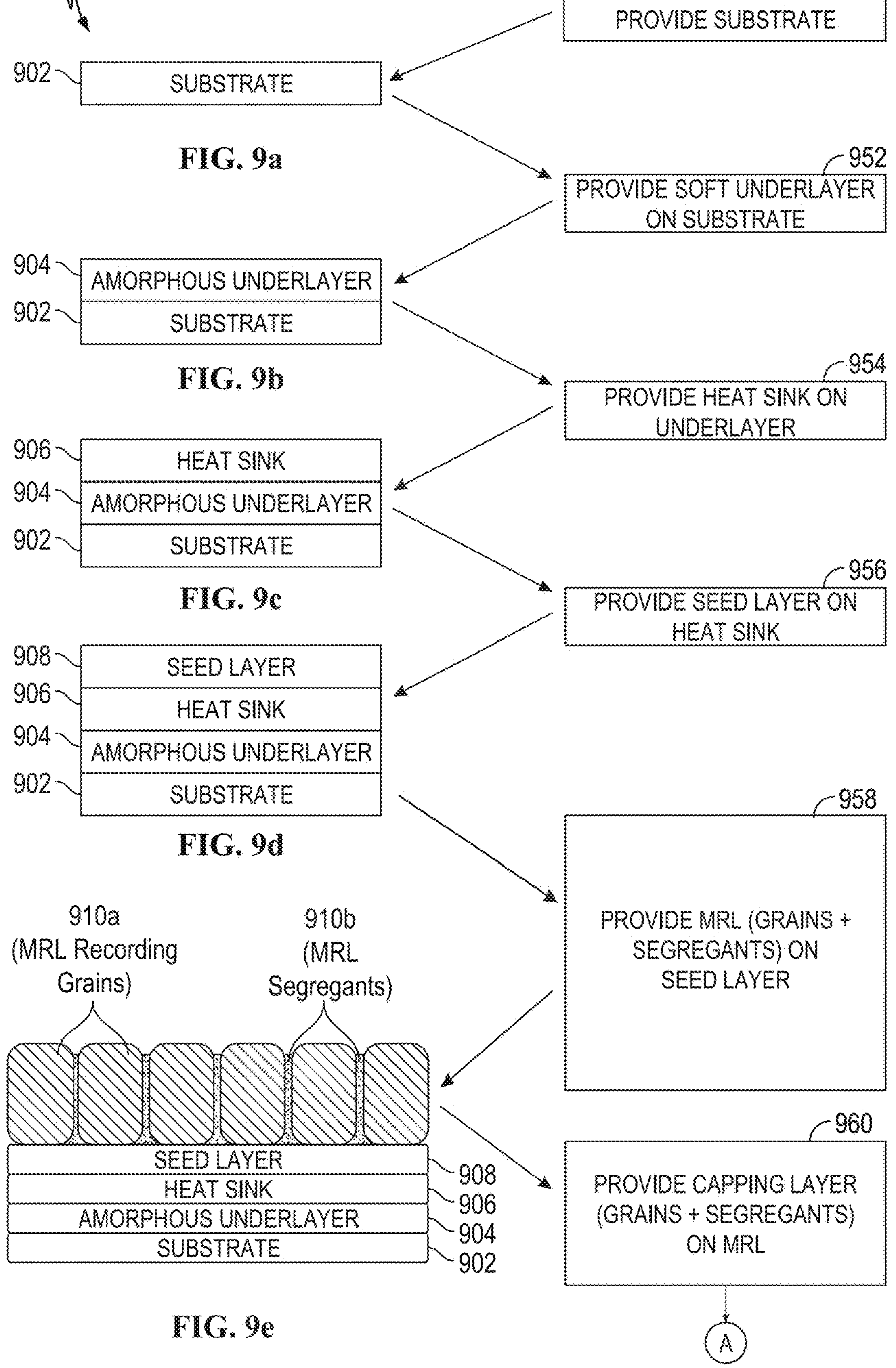

In FIG. 9*e*, the process provides (958) a magnetic recording layer (MRL) 910 on the seed layer 908. The MRL 910 could be made of any of the materials described above for MRLs 310/410, and can be formed of multiple layers as described above. In one aspect, the process deposits the MRL 910 using any of the deposition techniques described above. In some aspects, the MRL materials include materials that form recording grains 910*a* and materials that function as segregants 910*b* between the recording grains (e.g., where the segregants divide and define the recording grains at so called "grain boundaries"). The materials suitable for the recording grains 910*a* (e.g., FePt) and the segregants 910*b* (e.g., C, BN, $SiO_2$, AlN, Ag, $TiO_2$) are described above. In one aspect, the segregant is made of BN.

Figures 9F, 9G, 9H:
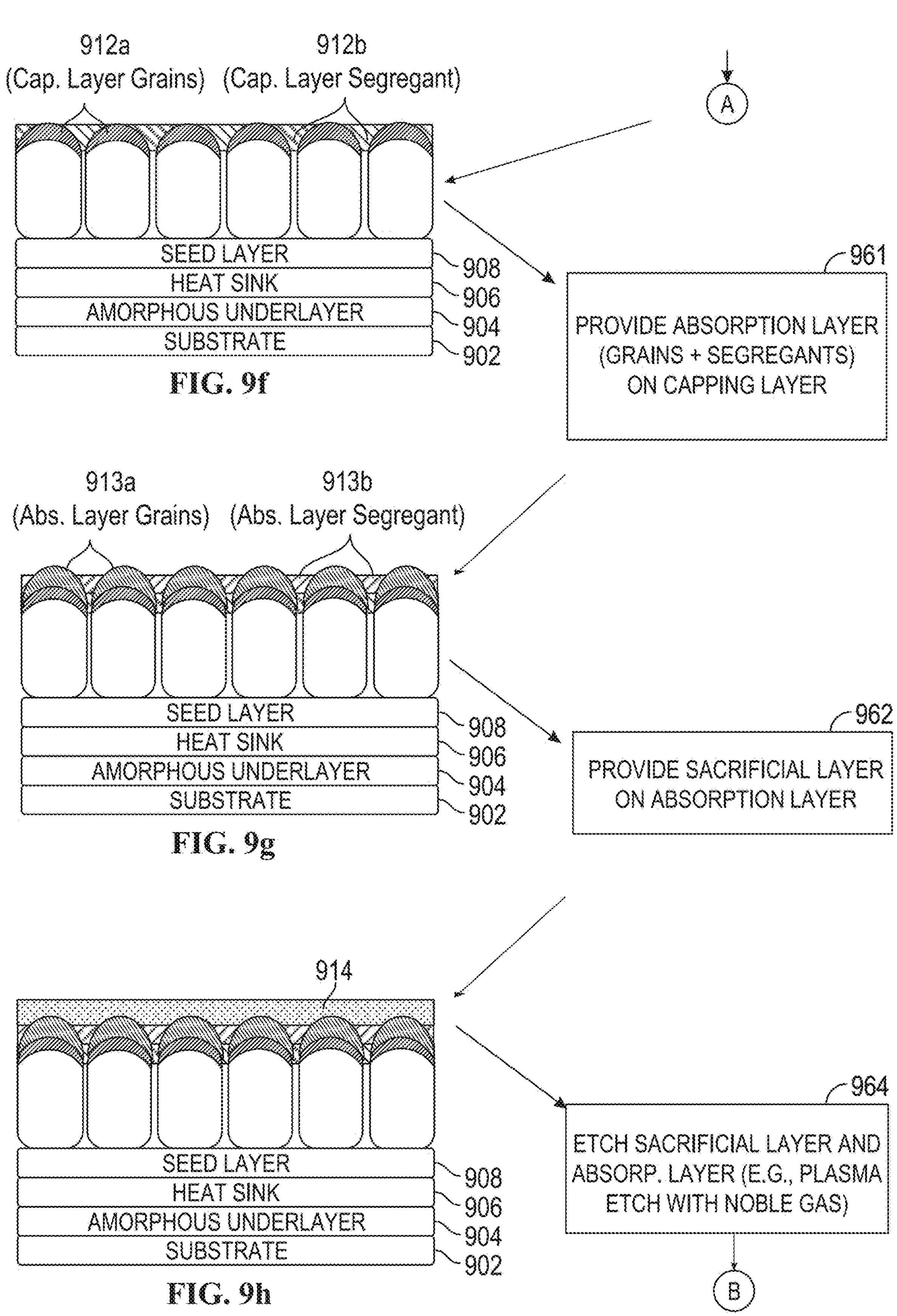

In FIG. 9*f*, the process provides the capping layer 912 on the MRL 910 (with a block 960 summarizing the process shown on the preceding drawing sheet). The capping layer 912 can include grain materials (e.g., capping grains 912*a* made of materials that form on or attach to the existing MRL grains 910*a*) and one or more segregants (e.g., capping segregants 912*b* that form on the existing MRL segregants 910*b*). The capping layer 912 could be made of any of the materials described above for capping layers 312/412, including for example, CoPt for the absorption grains and B for the capping segregant. In one aspect, the process deposits the capping layer 912 using any of the deposition techniques described above.

In FIG. 9*g*, the process provides (961) the absorption layer 913 on the MRL 910. The absorption layer 913 can include grain materials (e.g., absorption grains 913*a* made of materials that form on or attach to the existing capping layer grains 912*a*) and one or more segregants (e.g., absorption segregants 913*b* that form on the existing capping layer segregants 912*b*). The absorption layer 913 could be made of any of the materials described above for absorption layers 314/414, including for example, CoFe for the absorption grains and BN, SiO2, $B_2O_3$, and $ZrO_2$ for the absorption segregant. In one aspect, the process deposits the absorption layer 913 using any of the deposition techniques described above.

In FIG. 9*h*, the process provides (962) a sacrificial layer 914 on the absorption layer 913. The sacrificial layer 914 can be made of, for example, one or more of: non-hydrogenated C, SiO2, $Al_2O_3$, $ZrO_2$, or $TiO_2$. In one aspect, the process deposits the sacrificial layer 914 using any of the deposition techniques described above.

Figures 9I, 9J:
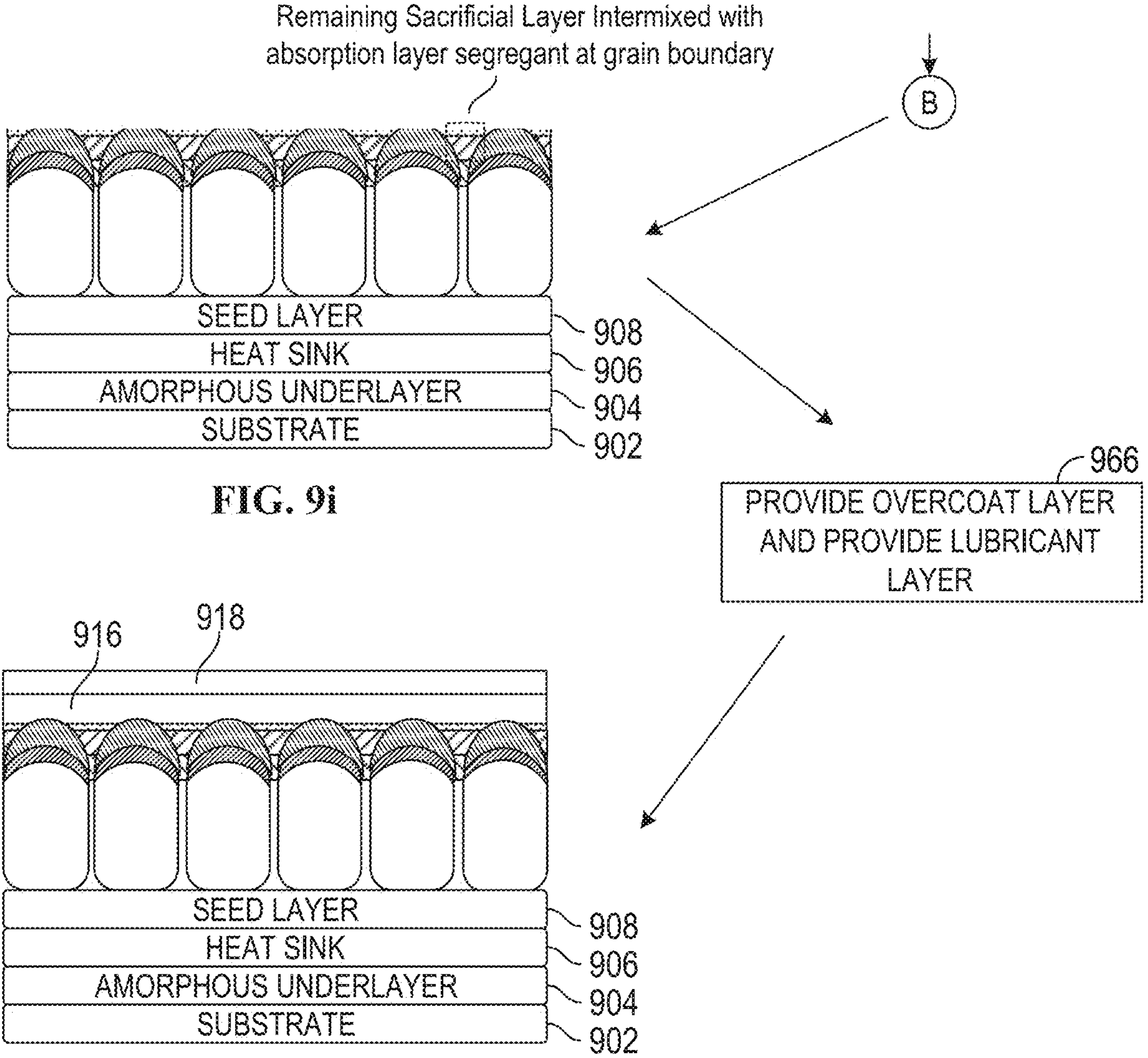

In FIG. 9*i*, the process etches the sacrificial layer 914 and portions of the absorption layer 913 (with a block 964 summarizing the process shown on the preceding drawing sheet). In one aspect, the process performs the etching (964) using a plasma enhanced etching with a noble gas such as one or more of Kr, Ar, or Xe. In one aspect, portions of the sacrificial layer 914 remain, after etching (964), at grain boundaries such that the sacrificial layer 914 becomes discontinuous with segments remaining at the grain boundaries. The absorption layer 913, and top portions of the absorption grains 913*a* in particular, are effectively planarized by the etching process. In one aspect, the etching process, and through the use of the sacrificial layer, is carefully tuned (for selective etching) to ensure planarization of the absorption grains 913*a* without etching (or otherwise damaging) the recording grains 910*a* or the capping grains 912*a*. In one aspect, the etching (964) involves etching the absorption grains 913*a* but not the absorption segregant (913*b*) at the grain boundaries. In one aspect, the etching the sacrificial layer and the portions of the absorption layer comprises etching the sacrificial layer and the portions of the absorption layer such that remaining portions of the sacrificial layer 914 are positioned substantially at the grain boundaries. In one aspect, the remaining portions of the sacrificial layer 914 are intermixed (chemically and/or physically) with the absorption segregants 913*b* at the grain boundaries (e.g., C of sacrificial layer 914 mixes with BN of the absorption segregants 913*b*).

In one aspect, the etching (964) involves etching the sacrificial layer until the sacrificial layer becomes discontinuous and comprises a plurality of segments each positioned at the grain boundaries, as shown for example in FIG. 9*h*.

In one aspect, the etching (964) involves etching the sacrificial layer and the portions of the absorption layer but does not include etching the MRL or capping layer.

In one aspect, the etching (964) involves etching the sacrificial layer and the portions of the absorption layer is performed at an etch rate less than 10 Å per second (Å/s).

In one aspect, the etching (964) of the sacrificial layer and the portions of the absorption layer results in a planarization of the portions of the absorption layer and remaining portions of the sacrificial layer, as shown for example in FIG. 9*i*.

In FIG. 9*j*, the process provides (966) an overcoat layer 916 on the absorption layer 912 and sacrificial layer 914, and then provides (966) a lubricant layer 918 on the overcoat layer 916. The overcoat layer 916 can be made of any of the materials described above for overcoat layers 316/416, including for example, DLC. The lubricant layer 918 can be made of any of the materials described above for lubricant layers 318/418, including for example, a polymer-based lubricant. In one aspect, the process deposits the overcoat layer 916 and/or lubricant layer 918 using any of the deposition techniques described above. In one aspect, the HAMR medium of FIG. 9*i* is substantially the same as that of FIG. 4.

In one aspect, the overcoat layer is made of diamond like carbon (DLC), and the sacrificial layer is made of C with properties different from the DLC (e.g., DLC is formed of hydrogenated carbon and the sacrificial layer carbon is not hydrogenated).

As noted above, HAMR mediums such as medium 900 or mediums 300/400 may also have additional intervening layers (e.g., such as a capping layer, an adhesion layer, a heatsink seed layer, a thermal resistive layer, etc.).

In one aspect, the process illustrated in FIGS. 9*a*-9*j* can be used to fabricate any of the HAMR media described above, including, for example, HAMR mediums 102, 300, and 400.

FIG. 10 is a graph 1000 showing exemplary magnetization (Ms) for a HAMR medium with a CoFe-based absorption layer formed of 33Co-49.5Fe-17.5$SiO_2$ as compared to another absorption layer of composition (62Co-38BN). The vertical axis 1002 shows Ms (emu/$cm^3$). The horizontal axis 1004 shows the thickness of the absorption layer in nm. The CoFe-based absorption layer values are indicated by squares 1006. The Co-based absorption layer values are indicated by circles 1008. The CoFe-based absorption layer exhibits significantly greater Ms than the Co-based absorption layer. Note that a solid horizontal line 1010 corresponds to an Ms (emu/$cm^3$) of 0. All of the measured Co-based absorption layer values shown in the figure are at or slightly above about 0 Ms (emu/$cm^3$). All of the measured Co—Fe-based absorption layer values shown in the figure are above 500 Ms (emu/$cm^3$), including one at about 900 Ms (emu/$cm^3$), which was obtained for an absorption layer thickness of 2.0 nm. Note also that this figure is based on absorption layers that were not subject to the etching process with sacrificial layer procedure shown in FIG. 9.

Additional Examples and Embodiments

Figure 11:
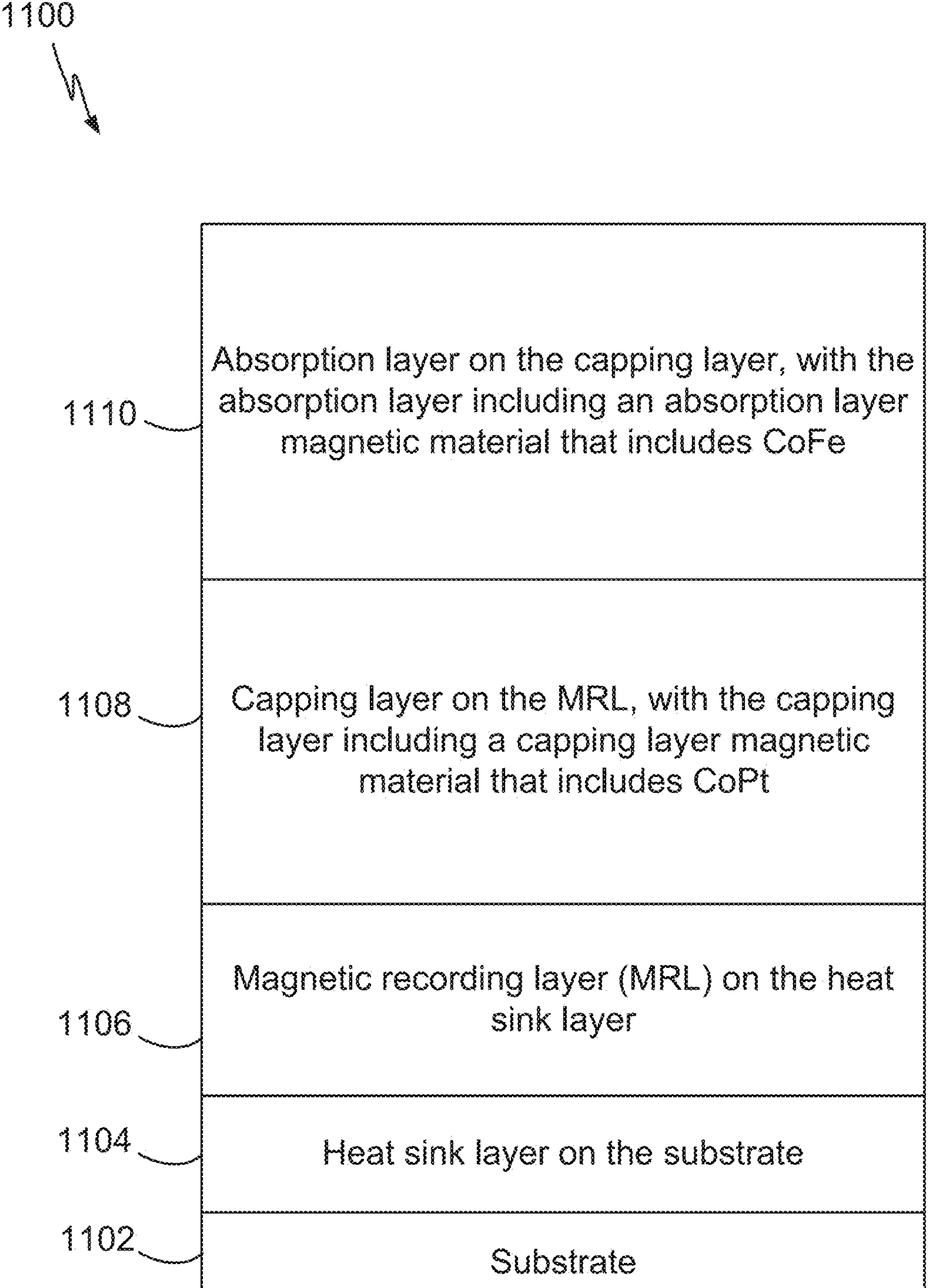
FIG. 11 is a side schematic view of another exemplary HAMR medium in accordance with an aspect of the disclosure.

FIG. 11 is a side schematic view of an exemplary magnetic recording medium 1100 in accordance with another aspect of the disclosure. The magnetic recording medium 1100 has a stacked structure with a substrate 1102, a heat sink layer 1104 on the substrate, an MRL 1106 on the heat sink layer 1104 (where the MRL may include, e.g., CoFe), and a capping layer 1108 on the MRL 1106 with the capping layer 1108 including a capping layer magnetic material that includes CoFe. That is, the capping layer has at least one different material from the MRL 1106 (e.g., CoPt instead of FePt). The magnetic recording medium 1100 also has an absorption layer 1110 on the capping layer 1108, with the absorption layer 1110 including an absorption layer magnetic material that includes CoFe. That is, the absorption layer has at least one different material from the capping layer 1108 (e.g., CoFe instead of CoPt). In some examples, the MRL 1106 has multiple magnetic recording layers and multiple non-magnetic ECLs. In some examples, the MRL may be configured with alternating ECLs and oxide magnetic layers. Additional segregants, layers, or films may be provided, such as those shown in the figures described above. Exemplary materials for the various layers are described above.

Figure 12:
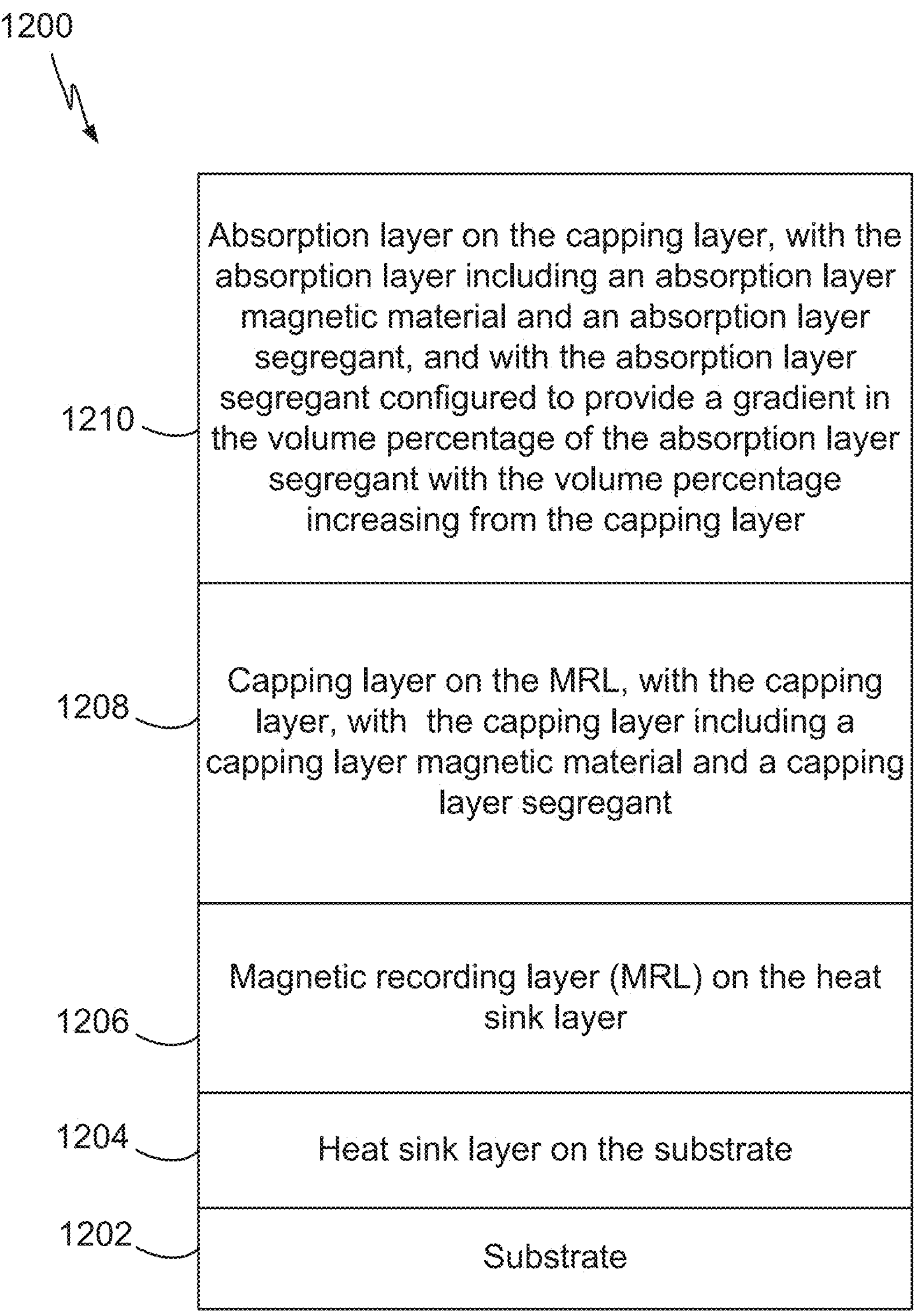
FIG. 12 is a side schematic view of yet another exemplary HAMR medium in accordance with an aspect of the disclosure.

FIG. 12 is a side schematic view of an exemplary magnetic recording medium 1200 in accordance with another aspect of the disclosure. The magnetic recording medium 1200 has a stacked structure with a substrate 1202, a heat sink layer 1204 on the substrate, an MRL 1206 on the heat sink layer 1204, a capping layer 1208 on the MRL 1206 with the capping layer 1208 including a capping layer magnetic material and a capping layer segregant, and an absorption layer 1210 on the capping layer 1208, with the absorption layer 1210 including an absorption layer magnetic material and an absorption layer segregant, and with the absorption layer segregant configured to provide a gradient in the volume percentage of the absorption layer segregant with the volume percentage increasing from the capping layer. For example, the absorption layer may include two absorption sub-layers, one on top of the other, with the upper sub-layer having a greater vol. % of segregants than the lower absorption sub-layer to provide an additional gradient in segregant vol. %. In some examples, the MRL 1206 has multiple magnetic recording layers and multiple non-magnetic ECLs. In some examples, the MRL may be configured with alternating ECLs and oxide magnetic layers. Additional layers or films may be provided, such as those shown in the figures described above. Exemplary materials for the various layers are described above.

Figure 13:
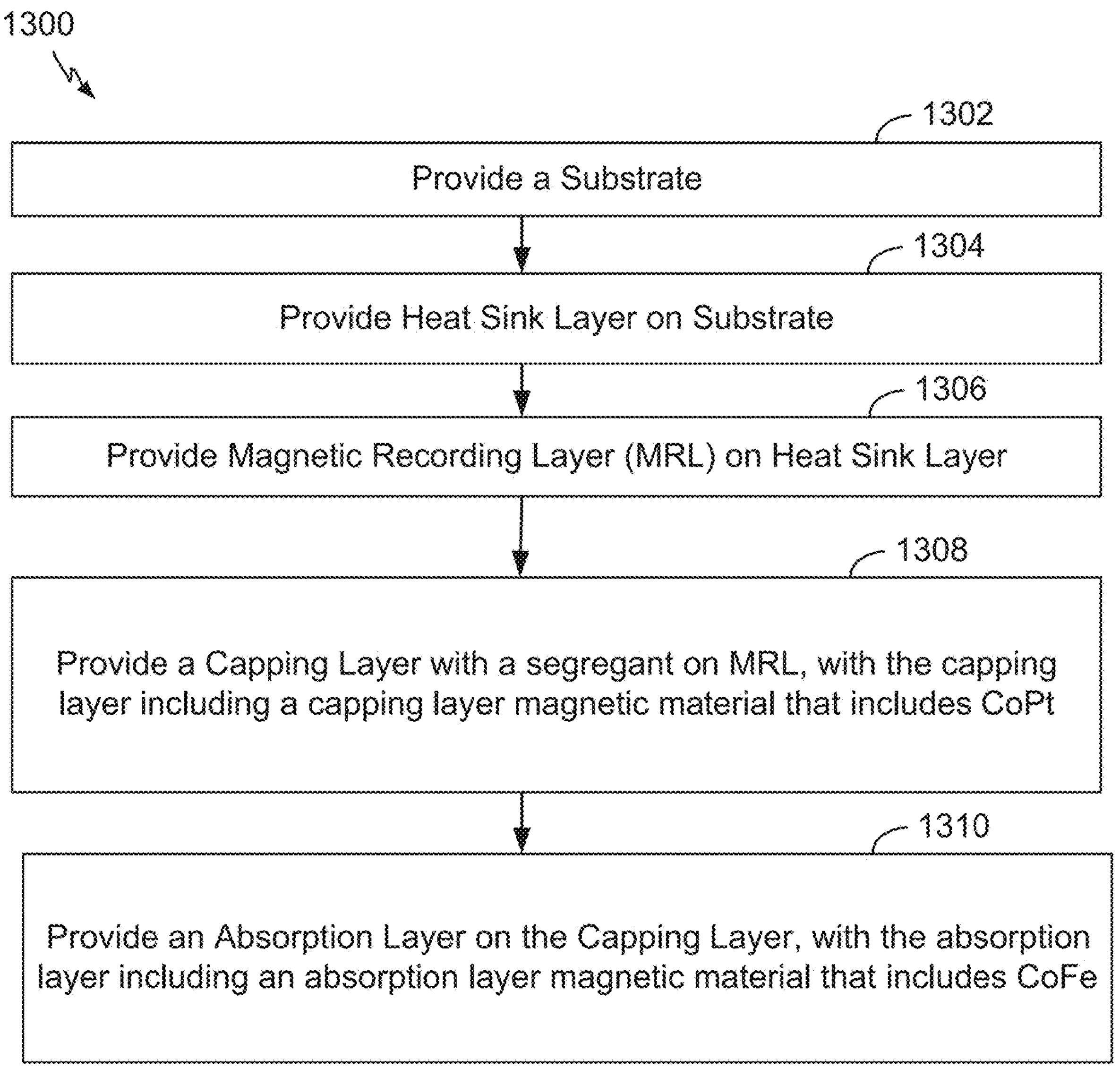
FIG. 13 is a flowchart of another exemplary process in accordance with an aspect of the disclosure.

FIG. 13 is a flowchart of an exemplary process 1300 for fabricating a HAMR medium that includes an absorption layer and a capping layer, in accordance with an aspect of the disclosure. In one aspect, the process 1300 can be used to fabricate any of the HAMR media described above. At block 1302, the process provides a substrate. At block 1304, the process provides a heatsink layer on the substrate. At block 1306, the process provides an MRL on the heatsink layer. At block 1308, the process provides a capping layer on the MRL, with the capping layer including a capping layer magnetic material that includes CoPt. At block 1310, the process provides an absorption layer on the capping layer, with the absorption layer including an absorption layer magnetic material that includes CoFe. Additional layers and segregants may be provided, as discussed above. Exemplary materials for the various layers are described above.

Additional Aspects

The examples set forth herein are provided to illustrate certain concepts of the disclosure. The apparatuses, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatuses, systems, and computer program products according to aspects of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer-readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding aspects. For instance, an arrow may indicate a waiting or monitoring period of unspecified duration between enumerated steps of the depicted aspect.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example aspects. The example systems and components described herein may be configured differently than described. For example, elements may be added to, removed from, or rearranged compared to the disclosed example aspects.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. It is further noted that the term "over" as used in the present application in the context of one component located over another component, may be used to mean a component that is on another component and/or in another component (e.g., on a surface of a component or embedded in a component). Thus, for example, a first component that is over the second component may mean that (1) the first component is over the second component, but not directly touching the second component, (2) the first component is on (e.g., on a surface of) the second component, and/or (3)

the first component is in (e.g., embedded in) the second component. The term "about 'value X'", or "approximately value X", as used in the disclosure shall mean within 10 percent of the 'value X'. For example, a value of about 1 or approximately 1, would mean a value in a range of 0.9-1.1. In one aspect, "about" as used herein may instead mean 5 percent. In the disclosure various ranges in values may be specified, described and/or claimed. It is noted that any time a range is specified, described and/or claimed in the specification and/or claim, it is meant to include the endpoints (at least in one embodiment). In another embodiment, the range may not include the endpoints of the range.

While the above descriptions contain many specific aspects of the invention, these should not be construed as limitations on the scope of the invention, but rather as examples of specific aspects thereof. Accordingly, the scope of the invention should be determined not by the aspects illustrated, but by the appended claims and their equivalents. Moreover, reference throughout this specification to "one aspect," "an aspect," or similar language means that a particular feature, structure, or characteristic described in connection with the aspect is included in at least one aspect of the present disclosure. Thus, appearances of the phrases "in one aspect," "in an aspect," and similar language throughout this specification may, but do not necessarily, all refer to the same aspect, but mean "one or more but not all aspects" unless expressly specified otherwise.

The terminology used herein is for the purpose of describing particular embodiments only and is not intended to be limiting of the embodiments. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Various components described in this specification may be described as "including" or made of certain materials or compositions of materials. In one aspect, this can mean that the component consists of the particular material(s). In another aspect, this can mean that the component comprises the particular material(s).

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A magnetic recording medium comprising:

a substrate;

a heat sink layer on the substrate;

a magnetic recording layer (MRL) on the heat sink layer;

a capping layer on the MRL, wherein the capping layer comprises a capping layer magnetic material that comprises CoPt; and an absorption layer on the capping layer, the absorption layer being a discrete layer separate from the capping layer, wherein the absorption layer comprises an absorption layer magnetic material that comprises CoFe.

2. The magnetic recording medium of claim 1, wherein the MRL comprises FePt.

3. The magnetic recording medium of claim 1, wherein the capping layer further comprises a capping layer segregant, and wherein the absorption layer further comprises an absorption layer segregant.

4. The magnetic recording medium of claim 3, wherein the capping layer segregant comprises a non-magnetic material, and wherein the absorption layer segregant comprises a non-magnetic material.

5. The magnetic recording medium of claim 4, wherein the capping layer segregant comprises one or more of BN, SiO2, B2O3, and ZrO2, and wherein the absorption layer segregant comprises one or more of BN, SiO2, B2O3, and ZrO2.

6. The magnetic recording medium of claim 3, wherein the capping layer segregant comprises a first volume percentage of the capping layer;

wherein the absorption layer segregant comprises a second volume percentage of the absorption layer; and wherein the second volume percentage is greater than the first volume percentage.

7. The magnetic recording medium of claim 6, wherein the second volume percentage is greater than the first volume percentage by at least 5 vol. %.

8. The magnetic recording medium of claim 6, wherein the second volume percentage is greater than the first volume percentage by an amount in the range of 5 vol. % to 15 vol. %.

9. The magnetic recording medium of claim 6, wherein the absorption layer comprises a first sub-layer and a second sub-layer; and wherein a volume percentage of the absorption layer segregant in the second sub-layer is greater than a volume percentage of the absorption layer segregant in the first sub-layer.

10. The magnetic recording medium of claim 1, wherein the absorption layer comprises one or more of 24.6Co-36.9Fe-38.5BN, 26Co-39Fe-35BN, 30Co-45Fe-25ZrO2, 31Co-46.5Fe-22.5-ZrO2, 34Co-51Fe-15B2O3, 32Co-48Fe-20SiO2, and 33Co-49.5Fe-17.5SiO2.

11. The magnetic recording medium of claim 1,
wherein the capping layer magnetic material comprises a plurality of capping layer grains separated by a capping layer segregant at grain boundaries of the plurality of capping layer grains;
wherein the absorption layer magnetic material is at positions corresponding to the capping layer grains and the absorption layer further comprises an absorption layer segregant at positions corresponding to the grain boundaries; and
wherein a sacrificial layer is embedded in the absorption layer at positions corresponding to the grain boundaries, the sacrificial layer comprising a non-magnetic material different from the absorption layer segregant, and wherein a top surface of the absorption layer and a top surface of the sacrificial layer are substantially coplanar.

12. The magnetic recording medium of claim 11, wherein the sacrificial layer comprises at least one of C, SiO2, Al2O3, ZrO2, or TiO2.

13. The magnetic recording medium of claim 1, further comprising:
an overcoat layer on the absorption layer; and
a lubricant layer on the overcoat layer.

14. A data storage device comprising:
a slider comprising a magnetic recording head; and
the magnetic recording medium of claim 1,
wherein the slider is configured to write information to the MRL of the magnetic recording medium using heat-assisted magnetic recording (HAMR).

15. A magnetic recording medium comprising:
a substrate;
a heat sink layer on the substrate;
a magnetic recording layer (MRL) on the heat sink layer;
a capping layer on the MRL, wherein the capping layer comprises a capping layer magnetic material and a capping layer segregant; and
an absorption layer on the capping layer, the absorption layer being a discrete layer separate from the capping layer, wherein the absorption layer comprises an absorption layer magnetic material and an absorption layer segregant, with the absorption layer segregant configured to provide a gradient in a volume percentage of the absorption layer segregant with the volume percentage increasing away from the capping layer.

16. The magnetic recording medium of claim 15,
wherein the absorption layer comprises a first sub-layer and a second sub-layer; and
wherein a volume percentage of the absorption layer segregant in the second sub-layer is greater than a volume percentage of the absorption layer segregant in the first sub-layer.

17. The magnetic recording medium of claim 16, wherein the volume percentage of the absorption layer segregant in the second sub-layer is greater than the volume percentage of the absorption layer segregant in the first sub-layer by at least 5 vol. %.

18. The magnetic recording medium of claim 16, wherein the volume percentage of the absorption layer segregant in the second sub-layer is greater than the volume percentage of the absorption layer segregant in the first sub-layer by an amount in the range of 5 vol. % to 15 vol. %.

19. The magnetic recording medium of claim 16, wherein the volume percentage of the absorption layer segregant in the first sub-layer is greater than the volume percentage of the absorption layer segregant in the capping layer by at least 5 vol. %.

20. The magnetic recording medium of claim 15, wherein the capping layer magnetic material comprises CoPt and the absorption layer magnetic material comprises CoFe.

21. The magnetic recording medium of claim 15, wherein the capping layer segregant comprises a non-magnetic material, and wherein the absorption layer segregant comprises a non-magnetic material.

22. The magnetic recording medium of claim 21, wherein the capping layer segregant comprises one or more of BN, SiO2, B2O3, and ZrO2, and wherein the absorption layer segregant comprises one or more of BN, SiO2, B2O3, and ZrO2.

23. The magnetic recording medium of claim 15, wherein the absorption layer comprises one or more of 24.6Co-36.9Fe-38.5BN, 26Co-39Fe-35BN, 30Co-45Fe-25ZrO2, 31Co-46.5Fe-22.5-ZrO2, 34Co-51Fe-15B2O3, 32Co-48Fe-20SiO2, and 33Co-49.5Fe-17.5SiO2.

24. A method for fabricating a magnetic recording medium, the method comprising:
providing a substrate;
providing a heat sink layer on the substrate;
providing a magnetic recording layer (MRL) on the heat sink layer;
providing a capping layer on the MRL, with the capping layer comprising a capping layer magnetic material that comprises CoPt; and
providing an absorption layer on the capping layer, the absorption layer being a discrete layer separate from the capping layer, wherein the absorption layer comprises an absorption layer magnetic material that comprises CoFe.

25. The method of claim 24,
wherein the capping layer further comprises a capping layer segregant that comprises a first volume percentage of the capping layer;
wherein the absorption layer further comprises an absorption layer segregant that comprises a second volume percentage of the absorption layer; and
wherein the second volume percentage is greater than the first volume percentage.

26. The method of claim 25, wherein the second volume percentage is greater than the first volume percentage by an amount in the range of 5 vol. % to 15 vol. %.

27. The method of claim 25, wherein the capping layer segregant comprises a non-magnetic material, and wherein the absorption layer segregant comprises a non-magnetic material.

28. The method of claim 27, wherein the capping layer segregant comprises one or more of BN, SiO2, and ZrO2, and wherein the absorption layer segregant comprises one or more of BN, SiO2, B2O3, and ZrO2.

29. The method of claim 24, wherein the absorption layer comprises one or more of 24.6Co-36.9Fe-38.5BN, 26Co-39Fe-35BN, 30Co-45Fe-25ZrO2, 31Co-46.5Fe-22.5-ZrO2, 34Co-51Fe-15B2O3, 32Co-48Fe-20SiO2, and 33Co-49.5Fe-17.5SiO2.

30. The method of claim 24, wherein providing the absorption layer comprises:
providing a first absorption sub-layer with segregants on the capping layer;
providing a second absorption sub-layer with segregants the first absorption layer; and wherein a volume percentage of the segregants of the second absorption sub-layer is greater than a volume percentage of the segregants of the first absorption sub-layer.

31. The method of claim 24, wherein a composition of the absorption layer is different from a composition of the capping layer.

32. The magnetic recording medium of claim 1, wherein a composition of the absorption layer is different from a composition of the capping layer.

33. The magnetic recording medium of claim 15, wherein a composition of the absorption layer is different from a composition of the capping layer.

* * * * *